(12) United States Patent
Omatsu et al.

(10) Patent No.: US 8,221,855 B2
(45) Date of Patent: Jul. 17, 2012

(54) CELLULOSE DERIVATIVE FILM, OPTICAL COMPENSATION FILM, POLARIZING PLATE, AND LIQUID CRYSTAL DEVICE

(75) Inventors: Tadashi Omatsu, Minami-Ashigara (JP); Nobutaka Fukagawa, Minami-Ashigara (JP); Hiromoto Haruta, Minami-Ashigara (JP); Yutaka Nozoe, Minami-Ashigara (JP); Tomohiro Ogawa, Minami-Ashigara (JP); Hiroaki Sata, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1148 days.

(21) Appl. No.: 12/088,193

(22) PCT Filed: Sep. 29, 2006

(86) PCT No.: PCT/JP2006/320020
§ 371 (c)(1),
(2), (4) Date: Mar. 26, 2008

(87) PCT Pub. No.: WO2007/037539
PCT Pub. Date: Apr. 5, 2007

(65) Prior Publication Data
US 2009/0117294 A1    May 7, 2009

(30) Foreign Application Priority Data

Sep. 30, 2005   (JP) .................................. 2005-288412

(51) Int. Cl.
*C09K 19/00*    (2006.01)
(52) U.S. Cl. .......... 428/1.31; 428/1.1; 349/117; 349/96; 349/88

(58) Field of Classification Search ................ 428/1.31, 428/1.1; 349/117, 96, 88
See application file for complete search history.

(56) References Cited

U.S. PATENT DOCUMENTS

2005/0142304 A1 *   6/2005   Kawanishi et al. .......... 428/1.31
2007/0048458 A1 *   3/2007   Haruta et al. ................ 428/1.31

FOREIGN PATENT DOCUMENTS

| JP | 2001-247717 A | 9/2001 |
|---|---|---|
| JP | 2002-241512 A | 8/2002 |
| JP | 2002-249599 A | 9/2002 |
| JP | 2002-322201 A | 11/2002 |
| JP | 2005-138375 A | 6/2005 |
| JP | 2005-154764 A | 6/2005 |
| WO | WO 2005/111676 | * 11/2005 |

OTHER PUBLICATIONS

PCT/ISA/210.
PCT/ISA/237.

* cited by examiner

*Primary Examiner* — James J Seidleck
*Assistant Examiner* — Deve E Valdez
(74) *Attorney, Agent, or Firm* — Buchanan Ingersoll & Rooney PC

(57) ABSTRACT

A cellulose derivative film having high optical isotropy over the whole visible region and high durability against high temperature and humidity conditions is provided. The film contains a cellulose derivative having a substituent the polarizability anisotropy $\Delta\alpha$ ($=\alpha x-(\alpha y+\alpha z)/2$) of which is $2.5 \times 10^{-24}$ cm$^3$ or more, and the film has an in-plane retardation Re and a thickness direction retardation Rth satisfying the respective inequalities: $|Rth(589)| \leq 25$ nm and $|Re(589)| \leq 10$ nm. Also provided are an optical compensation film, a polarizing plate, and a liquid crystal device that use the cellulose derivative film and exhibit excellent viewing angle characteristics and durability.

12 Claims, No Drawings

CELLULOSE DERIVATIVE FILM, OPTICAL COMPENSATION FILM, POLARIZING PLATE, AND LIQUID CRYSTAL DEVICE

TECHNICAL FIELD

This invention relates to a cellulose derivative film useful in liquid crystal displays (LCDs) and its applications including optical materials, such as an optical compensation film and a polarizing plate, and LCDs.

BACKGROUND ART

A cellulose acylate film has historically been used as an optical material and a substrate of photographic materials because of its toughness and flame retardancy. In particular, a cellulose acylate film has recently found frequent use as a transparent optical film for LCD application. Because a cellulose acylate film exhibits high optical transparency and isotropy, it is an excellent optical material for use in equipment dealing with polarization such as LCDs. Accordingly, it has been used as a polarizer protective film or a substrate of an optical compensation film that can improve display quality when viewed at an oblique angle (viewing angle compensation).

A polarizing plate used in an LCD is composed of a polarizer and a protective film on at least one side of the polarizer. An ordinary polarizer is obtained by staining a stretched polyvinyl alcohol (PVA) film with iodine or a dichroic dye. It is important for a protective film for the polarizer to have high optical isotropy. The characteristics of a polarizer are largely governed by the optical characteristics of the polarizer protective film. Therefore, a cellulose acylate film, particularly a triacetyl cellulose film, has often been used as a polarizer protective film.

The demand for LCDs with improved viewing angle characteristics has ever been increasing thereby boosting the demand for a polarizer protective film with higher optical isotropy. In other words, a protective film for a polarizer is keenly required to have not only a smaller front retardation (in-plane retardation) (hereinafter, "Re") but a smaller thickness direction retardation (hereinafter "Rth").

JP-A 2002-249599 and JP-A 2001-247717 propose adding a certain low-molecular compound to a cellulose acylate to improve the optical isotropy. The techniques disclosed necessitate the compound as an additive chosen from those having small volatility and good compatibility with the cellulose acylate. Further, when the production conditions of a film are regulated for the purpose of improving the uniformity of the optical characteristic distribution, there was a case where Rth sometimes could not be lowered even by using the foregoing material. Besides, although optical isotropy is achieved in a specific wavelength region, the isotropy cannot be seen as sufficient over the whole visible region, leaving room for further improvement.

An additional problem of the above techniques is that the film obtained has a high equilibrium water content. A polarizing plate having such a film as a protective film undergoes reduction in polarizing performance when used under a high temperature and humidity condition, still needing improvement.

DISCLOSURE OF THE INVENTION

An object of the present invention is to provide a cellulose derivative film showing high optical isotropy over the whole visible region, particularly a polarizer protective film that provides a polarizing plate endurable even under a high temperature and humidity condition.

Another object of the invention is to provide optical materials having the cellulose derivative film, such as an optical compensation film and a polarizing plate, that are excellent in durability as well as viewing angle characteristics.

Still another object of the invention is to provide an LCD using the polarizing plate.

As a result of extensive investigations, the present inventors have found that high optical isotropy over the whole visible wavelength region can be achieved by a cellulose derivative having a specific substituent, particularly a combination of the cellulose derivative and a compound having a spectral absorption maximum in a wavelength region of from 250 to 400 nm (hereinafter also referred to as a wavelength dispersion controlling agent). They have ascertained that the cellulose derivative film in which the specific substituent is highly hydrophobic has a very low equilibrium water content and therefore provides a polarizing plate exhibiting improved durability under a high temperature and humidity condition.

The present invention provides in its first aspect a cellulose derivative film containing a cellulose derivative having a substituent the polarizability anisotropy of which is $2.5 \times 10^{-24}$ cm$^3$ or more. The polarizability anisotropy is represented by equation (1):

$$\Delta\alpha = \alpha x - (\alpha y + \alpha z)/2 \qquad (1)$$

wherein αx is the largest of the eigenvalues obtained by diagonalization of a polarizability tensor; αy is the second largest of the eigenvalues obtained by diagonalization of a polarizability tensor; and αz is the smallest of the eigenvalues obtained by diagonalization of a polarizability tensor.

The cellulose derivative film has an Re and an Rth satisfying the respective inequalities (1) and (2):

$$|Rth(589)| \leq 25 \text{ nm} \qquad (1)$$

$$|Re(589)| \leq 10 \text{ nm} \qquad (2)$$

wherein Rth(λ) is a retardation in the thickness direction at a wavelength λ nm; and Re(λ) is an in-plane retardation at a wavelength λ nm.

The cellulose derivative film of the invention embraces preferred embodiments in which:
(i) The substituent having a polarizability anisotropy of $2.5 \times 10^{-24}$ cm$^3$ or more is a substituent containing an aromatic ring.
(ii) The substituent having a polarizability anisotropy of $2.5 \times 10^{-24}$ cm$^3$ or more is an aromatic acyl group.
(iii) The cellulose derivative film further contains a compound having a spectral absorption maximum in a wavelength range of from 250 to 400 nm.
(iv) The Rth(λ) satisfies inequality (3):

$$|Rth(700) - Rth(450)| \leq 30 \text{ nm} \qquad (3)$$

wherein Rth(λ) is as defined above.
(v) The cellulose derivative film has an equilibrium water content of 3.0% or less at 25° C. and 80% RH.
(vi) The ratio of the degree of alignment in the machine direction to the degree of alignment in the transverse direction is 1:0.9 to 1.1.

The invention also provides in its second aspect an optical compensation film having the cellulose derivative film of the invention and an optically anisotropic layer.

The invention also provides in its third aspect a polarizing plate having a polarizer and a transparent protective film on each side of the polarizer. At least one of the two protective films is the cellulose derivative film of the invention.

The invention also provides in its fourth aspect an LCD having a liquid crystal cell and a polarizing plate on each side of the liquid crystal cell. At least one of the polarizing plates is the polarizing plate of the invention.

The LCD of the invention embraces embodiments in which the display mode is a VA mode or an IPS mode.

The present invention provides a cellulose derivative film having high optical isotropy over the whole visible region, particularly a film providing a polarizing plate with high durability against high temperature and humidity. By using the cellulose derivative film, the invention also provides an optical compensation film and a polarizing plate that are excellent in viewing angle characteristics and durability and an LCD using the polarizing plate.

BEST MODE FOR CARRYING OUT THE INVENTION

The cellulose derivative film of the present invention will be described. The cellulose derivative film contains a cellulose derivative.

The cellulose derivative preferably has a substituent having a large polarizability anisotropy (hereinafter described) bonded to at least one of the three hydroxyl groups of its β-glucose ring, a constituent unit of cellulose. Use of cellulose substituted with a substituent having a large polarizability anisotropy makes it possible to provide a film with apparently reduced optical anisotropy. When the birefringence possessed by the substituent having a large polarizability anisotropy of the cellulose derivative is combined with the polarizability anisotropy possessed by a compound having a spectral absorption maximum (λmax) in a wavelength region of from 250 to 400 nm (hereinafter referred to as a wavelength dispersion controlling agent), a film exhibiting optical isotropy over the whole visible region can be obtained. Optical isotropy in the whole visible region can be achieved by adjusting the amount of the wavelength dispersion controlling agent according to the polarizability anisotropy of the substituent or the degree of substitution.

The substituent having a large polarizability anisotropy $\Delta\alpha$ is described below.

Polarizability anisotropy of a substituent can be obtained by molecular orbital calculations or calculations based on density functional theory. The substituent having a large polarizability anisotropy preferably has a polarizability anisotropy of $2.5 \times 10^{-24}$ cm$^3$ to $300 \times 10^{-24}$ cm$^3$, the polarizability anisotropy being represented by equation (1) below. Using the cellulose derivative having a substituent whose polarizability anisotropy is $2.5 \times 10^{-24}$ cm$^3$ or more, preferably as combined with the wavelength dispersion controlling agent, allows for producing a film that is optically isotropic over the whole visible wavelength region. The cellulose derivative having a substituent whose polarizability anisotropy is not more than $300 \times 10^{-24}$ cm$^3$ exhibits sufficient solubility in a solvent and provides a film with sufficient stiffness to be handled. The polarizability anisotropy of the substituent is more preferably $4.0 \times 10^{-24}$ to $300 \times 10^{-24}$ cm$^3$, even more preferably $6.0 \times 10^{-24}$ to $300 \times 10^{-24}$ cm$^3$, and most preferably $8.0 \times 10^{-24}$ to $300 \times 10^{-24}$ cm$^3$.

$$\Delta\alpha = \alpha x - (\alpha y + \alpha z)/2 \quad (1)$$

where αx is the largest of the eigenvalues obtained by diagonalization of a polarizability tensor; αy is the second largest of the eigenvalues obtained by diagonalization of a polarizability tensor; and αz is the smallest of the eigenvalues obtained by diagonalization of a polarizability tensor.

In the present invention, calculations of the substituent's polarizability anisotropy were performed using Gaussian 03 Revision B.03 (calculation software from Gaussian, Inc., U.S.A.). The geometry is optimized at B3LYP/6-31G*. The polarizability is calculated at B3LYP/6-311+G** using the optimized geometry. The resulting polarizability tensor is diagonalized, and the polarizability anisotropy is calculated from the resulting diagonal elements. The calculations are done for a partial structure containing the substituent bonded to the hydroxyl group of the β-glucose ring together with the oxygen atom of the hydroxyl group.

The cellulose derivative preferably contains a substituent having high hydrophobicity. Such a cellulose derivative forms a film the equilibrium water content of which is reduced to suppress deterioration of performance when used as an optical component in high temperature and humidity. The hydrophobicity of the hydrophobic substituent is preferably such that an —OH form resulting from hydrolysis of the substituent on the hydroxyl group of a β-glucose ring (a constituent unit of the cellulose derivative) has a logP value of 1.0 or greater, more preferably 1.5 or greater, even more preferably 2.0 or greater. The existence of a substituent having a logP value of 1.0 or greater produces pronounced inhibitory effect on change in performance due to high temperature and humidity. The greater the logP value, the higher the effect.

The substituent having high polarizability or high hydrophobicity is not particularly limited as long as is capable of bonding to the hydroxyl group of a β-glucose ring. Illustrative examples include an alkoxy group, an aryloxy group, an alkylcarbonyloxy group, an arylcarbonyloxy group, an alkylphosphoric acid oxy group, an arylphosphoric acid oxy group, an alkylboric acid oxy group, an arylboric acid oxy group, an alkylcarbonic acid oxy group, and an arylcarbonic acid oxy group.

Substituents containing an aromatic ring, such as aromatic acyl groups, are particularly preferred for their high polarizability anisotropy and high hydrophobicity.

The degree of substitution with the substituent having large polarizability anisotropy or high hydrophobicity is preferably 0.01 to 3.0, more preferably 0.1 to 2.7, even more preferably 0.3 to 2.5. The above range of substitution degree meets the objects of achieving optical isotropy over the whole visible region and of reducing the equilibrium water content of the resulting film while securing sufficient solubility in a solvent in the preparation of a dope. A film with a reduced equilibrium water content when used as a protective film for a polarizer provides a polarizing plate with improved durability.

As a wavelength dispersion controlling agent used in the present invention, there are many materials having a property of enlarging retardation of a film in the direction of thickness. Therefore, for obtaining an optically isotropic film, it is preferable to introduce a substituent having a large polarizability so as to lower retardation of a film in the direction of thickness. In view of this point, it is preferable to introduce a substituent having a large polarizability to 2-position or 3-position of β-glucose.

It is preferred for the cellulose derivative to have a substituent whose polarizability anisotropy is smaller than $2.5 \times 10^{-24}$ cm$^3$ bonded to the hydroxyl group of the β-glucose unit. To have such a substituent is effective in securing solubility in a solvent in the preparation of a dope for solution film formation and also in providing a film with a suitable elastic modulus for handling. The substituent whose polarizability anisotropy is smaller than $2.5 \times 10^{-24}$ cm$^3$ is not particularly limited as long as is capable of bonding to the hydroxyl group of a β-glucose unit. Exemplary examples are an alkoxy group, an aryloxy group, an alkylcarbonyloxy group, an arylcarbonyloxy group, an alkylphosphoric acid oxy group, an arylphosphoric acid oxy group, an alkylboric acid oxy group, an arylboric acid oxy group, an alkylcarbonic acid oxy group, and an arylcarbonic acid oxy group. Preferred of them is an alkylcarbonyloxy group, such as acetyl, propionyl or butyryl. An acetyl group is particularly preferred. The total degree (SS) of substitution with the substituent having a polarizability anisotropy smaller than $2.5 \times 10^{-24}$ cm$^3$ is preferably in a range satisfying formula (S1), more preferably formula (S2), even more preferably formula (S3), in relation to the total degree (SB) of substitution with the substitution having a polarizability anisotropy of $2.5 \times 10^{-24}$ cm$^3$ or more.

$$0 \leq SS \leq 3.0 - SB \tag{S1}$$

$$1.0 \leq SS \leq 3.0 - SB \tag{S2}$$

$$2.0 \leq SS \leq 3.0 - SB \tag{S3}$$

The cellulose derivative is preferably a mixed acid ester having an aliphatic acyl group and a substituted or unsubstituted aromatic acyl group. The substituted or unsubstituted aromatic acyl group includes one represented by formula (A):

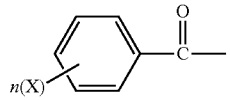

(A)

wherein X represents a substituent; and n represents a number of 0 to 5.

Examples of the substituent X include a halogen atom, a cyano group, an alkyl group, an alkoxy group, an aryl group, an aryloxy group, an acyl group, a carbonamido group, a sulfonamido group, a ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an arylsulfonyloxy group, —S—R, —NH—CO—OR, —PH—R, —P(—R)$_2$, —PH—O—R, —P(—R)(—O—R), —P(—O—R)$_2$, —PH(=O)—R, —P(=O)(—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O)(—R)—(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$, and —O—Si(—R)$_3$, wherein R represents an aliphatic group, an aromatic group or a heterocyclic group.

The number of the substituents X, represented by n, is preferably 1 to 5, more preferably 1 to 4, even more preferably 1 to 3, and most preferably 1 or 2.

Of the substituents X recited above preferred are a halogen atom, a cyano group, an alkyl group, an alkoxy group, an aryl group, an aryloxy group, an acyl group, a carbonamido group, a sulfonamido group, and a ureido group. More preferred are a halogen atom, a cyano group, an alkyl group, an alkoxy group, an aryloxy group, an acyl group, and a carbonamido group. Even more preferred are a halogen atom, a cyano group, an alkyl group, an alkoxy group, and an aryloxy group. A halogen atom, an alkyl group, and an alkoxy group are particularly preferred.

Examples of the halogen atom include fluorine, chlorine, bromine, and iodine. The alkyl group may be cyclic and may be branched. The carbon atom number of the alkyl group is preferably up to 20, more preferably 1 to 12, even more preferably 1 to 6, and most preferably 1 to 4. Examples of the alkyl group are methyl, ethyl, propyl, isopropyl, butyl, t-butyl, hexyl, cyclohexyl, octyl, and 2-ethylhexyl. The alkoxy group may be cyclic and may be branched. The carbon atom number of the alkoxy group is preferably up to 20, more preferably up to 12, even more preferably up to 6, and most preferably 1 to 4. The alkoxy group may be substituted with another alkoxy group. Examples of the alkoxy group are methoxy, ethoxy, 2-methoxyethoxy, 2-methoxy-2-ethoxyethoxy, butoxy, hexyloxy, and octyloxy.

The aryl group preferably contains 6 to 20, more preferably 6 to 12, carbon atoms. Examples of the aryl group include phenyl and naphthyl. The aryloxy group preferably contains 6 to 20, more preferably 6 to 12, carbon atoms. Examples of the aryloxy group are phenoxy and naphthoxy. The acyl group preferably contains 1 to 20, more preferably 1 to 12, carbon atoms. Examples of the acyl group are formyl, acetyl, and benzoyl. The carbonamido group preferably contains 1 to 20, more preferably up to 12, carbon atoms. Examples of the carbonamido group include acetamido and benzamido. The sulfonamido group preferably contains 1 to 20, more preferably 1 to 12, carbon atoms. Examples of the sulfonamido group include methanesulfonamido, benzenesulfonamido, and p-toluenesulfonamido. The ureido group preferably contains 1 to 20, more preferably 1 to 12, carbon atoms. Examples of the ureido group include an unsubstituted ureido group.

The aralkyl group preferably contains 7 to 20, more preferably 7 to 12, carbon atoms. Examples of the aralkyl group are benzyl, phenethyl, and naphthyl. The alkoxycarbonyl group preferably contains 2 to 20, more preferably 2 to 12, carbon atoms. Examples of the alkoxycarbonyl group include methoxycarbonyl. The aryloxycarbonyl group preferably contains 7 to 20, more preferably 7 to 12, carbon atoms. Examples of the aryloxycarbonyl group include phenoxycarbonyl. The aralkyoxycarbonyl group preferably contains 8 to 20, more preferably 8 to 12, carbon atoms. Examples of the aralkyloxycarbonyl group include benzyloxycarbonyl. The carbamoyl group preferably contains 1 to 20, more preferably 12, carbon atoms. Examples of the carbamoyl group are unsubstituted carbamoyl and N-methylcarbamoyl. The sulfamoyl group preferably contains up to 20, more preferably up to 12, carbon atoms. Examples of the sulfamoyl group are unsubstituted sulfamoyl and N-methylsulfamoyl. The acyloxy group preferably contains 1 to 20, more preferably 2 to 12, carbon atoms. Examples of the acyloxy group are acetoxy and benzoyloxy.

The alkenyl group preferably contains 2 to 20, more preferably 2 to 12, carbon atoms. Examples of the alkenyl group include vinyl, allyl, and isopropenyl. The alkynyl group preferably contains 2 to 20, more preferably 2 to 12, carbon atoms. Examples of the alkynyl group include ethynyl. The alkylsulfonyl group preferably contains 1 to 20, more preferably 1 to 12, carbon atoms. The arylsulfonyl group preferably contains 6 to 20, more preferably 6 to 12, carbon atoms. The alkyloxysulfonyl group preferably contains 1 to 20, more preferably 1 to 12, carbon atoms. The aryloxysulfonyl group preferably contains 6 to 20, more preferably 6 to 12, carbon atoms. The alkylsulfonyloxy group preferably contains 1 to 20, more preferably 1 to 12, carbon atoms. The arylsulfonyloxy group preferably contains 6 to 20, more preferably 6 to 12, carbon atoms.

The aliphatic acyl group, which is the fatty acid ester residual group of the mixed acid ester as the cellulose derivative of the invention, preferably contains 2 to 20 carbon atoms. Examples of the aliphatic acyl group include acetyl, propionyl, butyryl, isobutyryl, valeryl, pivaloyl, hexanoyl, octanoyl, lauroyl, and stearoyl. Preferred of them are acetyl, propionyl, and butyryl, with acetyl being particularly preferred. The term "aliphatic acyl group" is intended to include a substituted aliphatic acyl group. Substituents of the substituted aliphatic acyl group include those recited above as examples of X in formula (A).

In formula (A), the number of the substituents X, represented by n, is 0 to 5, preferably 1 to 3, more preferably 1 or 2.

When n in formula (A) is 2 or greater, the two or more Xs may be the same or different or may be taken together to form a fused polycyclic ring, e.g., a naphthalene, indene, indane, phenanthrene, quinoline, isoquinoline, chromene, chroman, phthalazine, acridine, indole or indoline ring.

Substitution of the hydroxyl group of cellulose with an aromatic acyl group is generally carried out by a process using an aromatic carboxylic acid chloride or a symmetric acid anhydride derived from an aromatic carboxylic acid and a mixed acid anhydride. A process using an acid anhydride derived from an aromatic carboxylic acid (see *Journal of Applied Polymer Science*, Vol. 29, pp. 3981-3990 (1984)) is particularly preferred. For example, a mixed acid ester as the cellulose derivative can be produced by a process including once preparing a fatty acid mono- or diester of cellulose and introducing an aromatic acyl group of formula (A) or a process including allowing an aliphatic/aromatic mixed carboxylic acid anhydride to react directly on cellulose. In the former process, the technique of preparing a cellulose fatty acid mono- or diester is known. The reaction conditions for introducing an aromatic acyl group into the ester are, while varying according to the kind of the aromatic acyl group, preferably 0° to 100° C., more preferably 20° to 50° C., in temperature and 30 minutes or longer, more particularly 30 to 300 minutes, in time. In the latter process, the reaction conditions are, while varying according to the kind of the mixed acid anhydride, preferably 0° to 100° C., more preferably 20° to 50° C., and 30 to 300 minutes, more preferably 60 to 200 minutes. Each of the above reactions is conducted with or without a solvent, preferably with a solvent. Suitable solvents include dichloromethane, chloroform, and dioxane.

When an aromatic acyl group is introduced into a cellulose fatty acid monoester (having two hydroxyl groups remaining unsubstituted per glucose unit), the degree of substitution with the aromatic acyl group is 2.0 or less, preferably 0.1 to 2.0. When an aromatic acyl group is introduced into a cellulose fatty acid diester (having one hydroxyl group remaining unsubstituted per glucose unit), the degree of substitution with the aromatic acyl group is 1.0 or less, preferably 0.1 to 1.0.

Specific examples of the aromatic acyl group represented by formula (A) are shown below for illustrative purpose only but not for limitation. Preferred of the aromatic acyl groups below are Nos. 1, 3, 5, 6, 8, 13, 18, and 28. More preferred are Nos. 1, 3, 6, and 13.

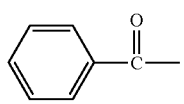

1

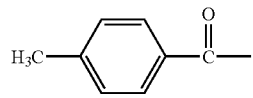

2

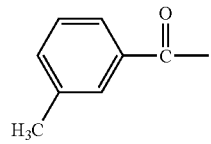

3

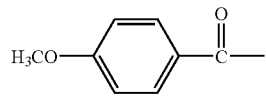

4

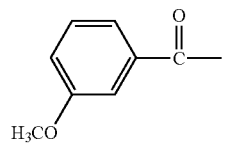

5

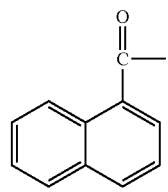

6

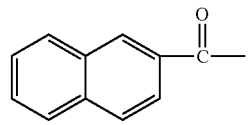

7

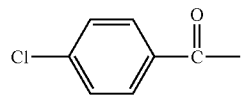

8

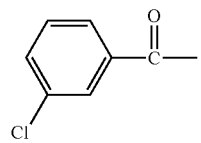

9

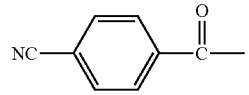

10

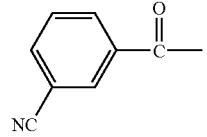

11

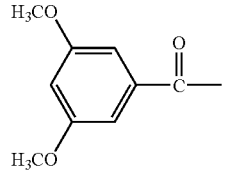

12

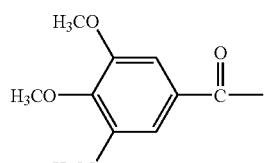
13
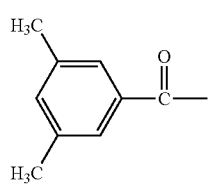
14
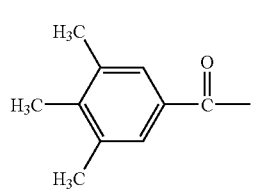
15
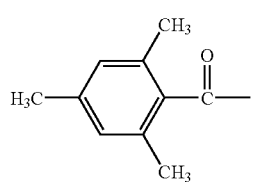
16
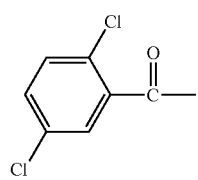
17
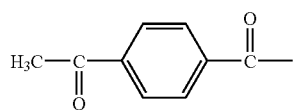
18
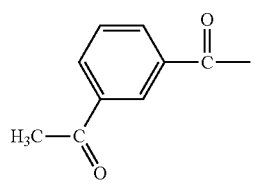
19
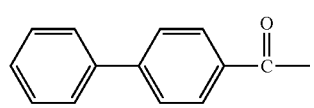
20
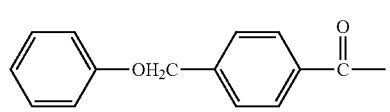
21
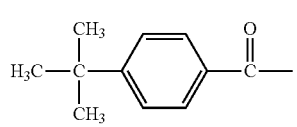
22

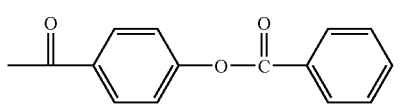

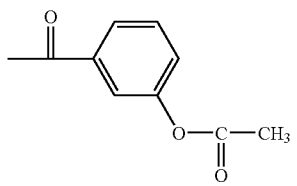

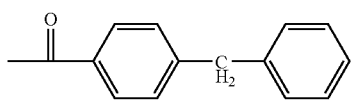

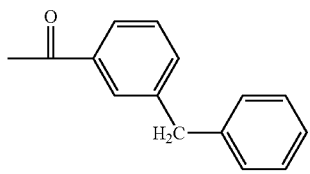

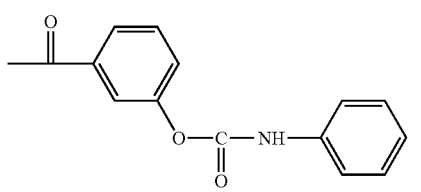

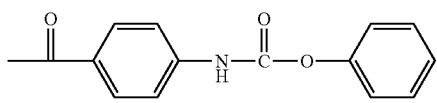

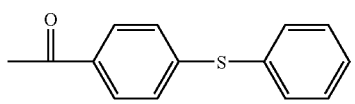

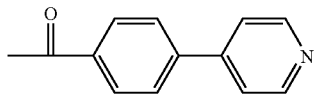

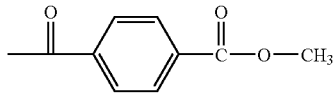

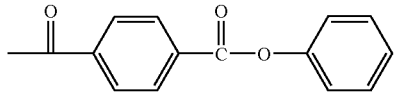

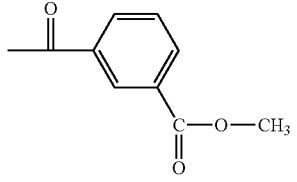

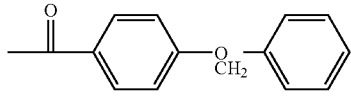

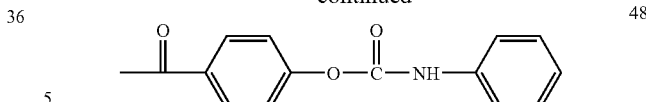

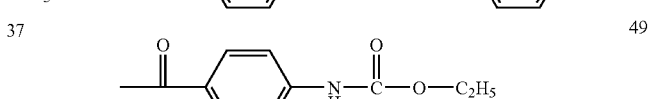

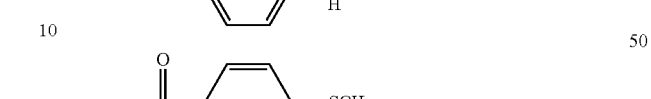

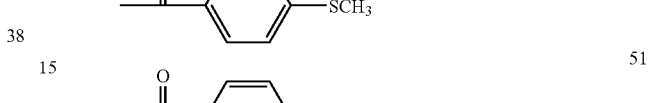

The cellulose derivative preferably has a degree of hydroxyl group substitution of 1.5 to 3.00, more preferably 2.0 to 2.98.

The cellulose derivative preferably has a weight average degree of polymerization of 130 to 800, more preferably 200 to 600, and a number average molecular weight of 70,000 to 230,000, more preferably 75,000 to 230,000, even more preferably 78,000 to 120,000.

The cellulose derivative can be synthesized using an acid anhydride, an acid chloride or a halide as an acylating agent, an alkylating agent or an arylating agent. In using an acid anhydride as an acylating agent, the reaction can be carried out in the presence of a protonic catalyst such as sulfuric acid in a solvent such as an organic acid (e.g., acetic acid) or methylene chloride. In using an acid chloride as an acylating agent, a basic compound is used as a catalyst. The most industrially proven process consists of esterifying cellulose with a mixed organic acid component containing an organic acid corresponding to a desired acyl group (e.g., acetyl), such as acetic acid, propionic acid or butyric acid, or an anhydride thereof, such as acetic anhydride, propionic anhydride or butyric anhydride. One of common processes for introducing an alkyl group or an aryl group as a substituent consists of dissolving cellulose in an alkali solution, followed by etherification with an alkyl halide or an aryl halide.

The synthesis of the cellulose derivative of the invention will be describe in detail taking, for instance, the synthesis of a cellulose acylate that is preferably used in the invention. In the process described below, it is a frequently followed practice that cellulose from cotton linter, wood pulp, etc. is activated with an organic acid (e.g., acetic acid) and then esterified using a solution of the above-described mixed organic acid component in the presence of a sulfuric acid catalyst. The organic acid anhydride component is usually used in excess with respect to the hydroxyl group content of the cellulose. The esterification reaction is accompanied by hydrolysis of the cellulose main chain (β1→4 glycoside bond), i.e., depolymerization of cellulose. Progress of the hydrolysis of the main chain leads to reduction in polymerization degree of the cellulose ester, which results in reduction of physical properties of the resulting cellulose ester film. It is therefore desirable that the reaction conditions such as temperature be decided with due considerations to the polymerization degree or molecular weight of the resulting cellulose ester.

In order to obtain a cellulose ester with a high degree of polymerization, i.e., a high molecular weight, it is important to control the highest temperature in the esterification step at or below 50° C. The highest temperature is preferably controlled between 35° and 50° C., more preferably between 37° and 47° C. The esterification reaction proceeds smoothly at a reaction temperature of 35° C. or higher. At reaction temperatures of 50° C. or lower, such disadvantages as reduction in polymerization degree are averted.

After completion of the esterification, it is preferred that the reaction be terminated taking care so as to suppress a rise in temperature of the reaction system, which is effective in further reducing the reduction in polymerization degree to produce a cellulose ester retaining a high polymerization degree. On adding a reaction terminator (e.g., water or acetic acid) to the reaction system, the excess of the acid anhydride that has not participated in the esterification is hydrolyzed to produce a corresponding organic acid as a by-product. The hydrolysis involves vigorous heat generation, which raises the inner temperature of the reaction equipment. If the rate of addition of the reaction terminator is too high, the heat generation is so abrupt as to exceed the cooling capacity of the equipment and, as a result, hydrolysis of the cellulose main chain proceeds significantly, only to produce a cellulose ester with a reduced polymerization degree. Part of the catalyst bonds to cellulose during the esterification reaction but is, for the most part, dissociated from the cellulose ester while a reaction terminator is being added. Unless the rate of addition of the reaction terminator is too high, a reaction time enough for the bonded catalyst to be dissociated is secured, hardly causing a problem that part of the catalyst remains bonded to the cellulose ester. A cellulose ester having part of a strong acid (catalyst) bonded thereto is very labile and ready to decompose by drying heat, etc. to reduce in polymerization degree. For these reasons, it is desirable to take time in adding a reaction terminator after the esterification reaction. The reaction terminator is preferably added over a period of at least 4 minutes, more preferably 4 to 30 minutes. An anticipated problem of reduction in industrial productivity is avoided as long as the time of addition is within 30 minutes.

While water or an alcohol capable of decomposing an acid anhydride is usually used as a reaction terminator, it is preferred in the present invention to use a mixture of water and an organic acid as a reaction terminator so as to prevent a triester having low solubility in various organic solvents from precipitating. The esterification reaction under the above-mentioned conditions easily produces a high molecular weight cellulose ester whose weight average polymerization degree is 500 or higher.

(Wavelength Dispersion Controlling Agent)

The cellulose derivative film of the invention preferably contains a compound having a λmax in a wavelength region of from 250 to 400 nm as a wavelength dispersion controlling agent in combination with the aforementioned specific cellulose derivative. Such an additive has an increased wavelength dispersion of Rth with decreasing in wavelength in a range of from short wave length to λmax in visible region, which does not affect coloration. Therefore, the addition of the additive to the film such as a cellulose derivative wherein the shorter is the wavelength, the smaller the wavelength dispersion can provide a film having a small dependency on wavelength.

The λmax of the wavelength dispersion controlling agent is preferably from 270 to 360 nm.

The wavelength dispersion controlling agent preferably has an absorbance of 0.2 or less, more preferably 0.10 or less, at 400 nm. A film free from coloration as well as highly optically isotropic can be obtained by using the wavelength dispersion controlling agent having the recited absorption characteristics.

The wavelength dispersion controlling agent may serve the function as an ultraviolet absorber.

Compounds represented by formulae (III) to (VII) shown below are particularly preferred as a wavelength dispersion controlling agent.

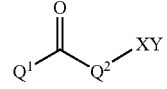

(III)

wherein $Q^1$ and $Q^2$ each represent an aromatic ring; X represents a substituent; Y represents an oxygen atom, a sulfur atom or a nitrogen atom; or YX, taken as a unit, represents a hydrogen atom.

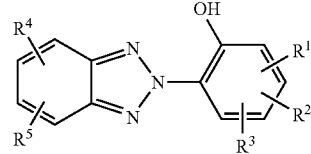

(IV)

wherein $R^1$, $R^2$, $R^3$, $R^4$, and $R^5$ each represent a monovalent organic group, provided that at least one of $R^1$, $R^2$, and $R^3$ is an unsubstituted straight-chain or branched alkyl group having 10 to 20 carbon atoms.

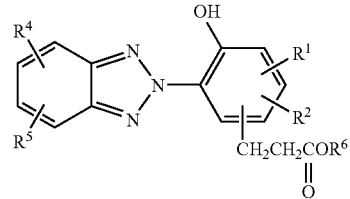

(V)

wherein $R^1$, $R^2$, $R^4$, and $R^5$ each represent a monovalent organic group; and $R^6$ represents a branched alkyl group.

Compounds represented by formula (VI) are also preferably used as taught in JP-A 2003-315549.

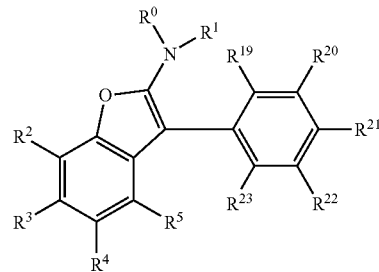

(VI)

wherein $R^0$ and $R^1$ each represent a hydrogen atom, an alkyl group having 1 to 25 carbon atoms, a phenylalkyl group having 7 to 9 carbon atoms, a phenyl group, a phenyl group substituted with an alkyl group having 1 to 4 carbon atoms, a substituted or unsubstituted oxycarbonyl group or a substituted or unsubstituted aminocarbonyl group; and $R^2$, $R^3$, $R^4$, $R^5$, $R^{19}$, $R^{20}$, $R^{21}$, $R^{22}$, and $R^{23}$ each represent a hydrogen atom or a substituted or unsubstituted alkyl group having 2 to 20 carbon atoms.

Useful wavelength dispersion controlling agents additionally include hydroxybenzophenone compounds, benzotriazole compounds, salicylic ester compounds, cyanoacrylate compounds, and nickel complex compounds.

The compounds represented by formula (III) include benzophenone compounds.

Examples of the benzotriazole UV absorbers include, but are not limited to, 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)benzotriazole, 2-(2'-hydroxy-3',5'-di-t-butylphenyl)-5-chlorobenzotriazole, 2-(2'-hydroxy-3',5'-di-t-amylphenyl)-5-chlorobenzotriazole, 2-(2'-hydroxy-3'-(3'',4'',5'',6''-tetrahydrophthalimidomethyl)-5'-methylphenyl)benzotriazole, 2,2-methylenebis(4-(1,1,3,3-tetramethylbutyl)-6-(2H-benzotriazol-2-yl)phenol), 2-(2'-hydroxy-3'-t-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), 2,4-bis(n-octylthio)-6-(4-hydroxy-3,5-di-t-butylanilino)-1,3,5-triazine, 2-(2'-hydroxy-3',5'-di-t-butylphenyl)-5-chlorobenzotriazole, 2-(2'-hydroxy-3',5'-di-t-amylphenyl)-5-chlorobenzotriazole, 2,6-di-t-butyl-p-cresol, pentaerythritol tetrakis[3-(3,5-di-t-butyl-4-hydroxyphenyl)propionate], triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamide), 1,3,5-trimethyl-2,4,6-tris(3,5-di-t-butyl-4-hydroxybenzyl)benzene, and tris(3,5-di-t-butyl-4-hydroxybenzyl) isocyanurate. Preferred of them are 2,4-bis(n-octylthio)-6-(4-hydroxy-3,5-di-t-butylanilino)-1,3,5-triazine, 2-(2'-hydroxy-3',5'-di-t-butylphenyl)-5-chlorobenzotriazole, 2-(2'-hydroxy-3',5'-di-t-amylphenyl)-5-chlorobenzotriazole, 2,6-di-t-butyl-p-cresol, pentaerythritol tetrakis[3-(3,5-di-t-butyl-4-hydroxyphenyl)propionate], and triethylene glycol bis[3-(3-t-butyl-5-methyl-4-hydroxyphenyl)propionate]. A hydrazine metal deactivator, such as N,N'-bis[3-(3,5-di-t-butyl-4-hydroxyphenyl)propionyl]hydrazine, or a phosphorus processing stabilizer, such as tris(2,4-di-t-butylphenyl) phosphite, may be used in combination. These compounds is preferably used in an amount of 0.1% to 30%, more preferably 0.1% to 25%, even more preferably 0.1% to 20%, by weight based on the cellulose derivative.

A UV absorber represented by formula (VII) below will be described in detail.

$$Q^1\text{-}Q^2\text{-}OH \qquad (VII)$$

wherein $Q^1$ represents a 1,3,5-triazine ring; and $Q^2$ represented by an aromatic ring.

Of the compounds represented by formula (VII) more preferred are those represented by formula (VII-A):

Formula (VII-A):

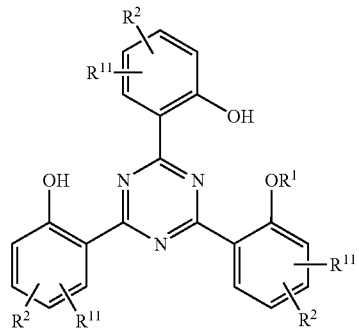

wherein $R^1$ represents (1) an alkyl group having 1 to 18 carbon atoms, (2) a cycloalkyl group having 5 to 12 carbon atoms, (3) an alkenyl group having 3 to 18 carbon atoms, (4) a phenyl group, (5) an alkyl group with 1 to 18 carbon atoms substituted with a phenyl group, a hydroxyl group, an alkoxy group having 1 to 18 carbon atoms, a cycloalkoxy group having 5 to 12 carbon atoms, an alkenyloxy group having 3 to 18 carbon atoms, a halogen atom, —COOH, —COOR$^4$, —O—CO—R$^5$, —O—CO—O—R$^6$, —CO—NH$_2$, —CO—NHR$^7$, —CO—N(R$^7$)(R$^8$), CN, NH$_2$, NHR$^7$, —N(R$^7$)(R$^8$), —NH—CO—R$^5$, a phenoxy group, an alkylphenoxy group with 1 to 18 carbon atoms in its alkyl moiety, a phenylalkoxy group having 1 to 4 carbon atoms in its alkyl moiety, a bicycloalkoxy group having 6 to 15 carbon atoms, a bicycloalkylalkoxy group having 6 to 15 carbon atoms, a bicycloalkenylalkoxy group having 6 to 15 carbon atoms or a tricycloalkoxy group having 6 to 15 carbon atoms, (6) a cycloalkyl group with 5 to 12 carbon atoms substituted by a hydroxyl group, an alkyl group having 1 to 4 carbon atoms, an alkenyl group having 2 to 6 carbon atoms or —O—CO—R$^5$, (7) a glycidyl group, (8) —CO—R$^9$, (9) —SO$_2$—R$^{10}$, (10) an alkyl group having 3 to 50 carbon atoms which is interrupted by one or more oxygen atoms and/or substituted by a hydroxyl group, a phenoxy group or an alkylphenoxy group having 7 to 18 carbon atoms, (11) -A, (12) —CH$_2$—CH(XA)-CH$_2$-0-R$^{12}$, (13) —CR$^{13}$R$^{'13}$—(CH$_2$)$_m$—X-A-, (14) —CH$_2$—CH(OA)-R$^{14}$, (15) —CH$_2$—CH(OH)—CH$_2$—XA,

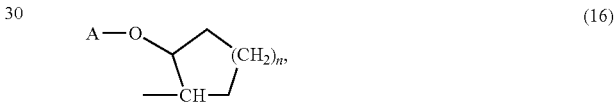

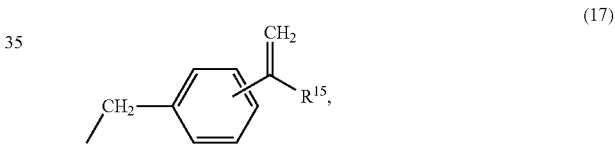

(18) —CR$^{15}$R$^{'15}$—C(=CH$_2$)—R$^{''15}$, (19) —CR$^{13}$R$^{'13}$—(CH$_2$)$_m$—CO—X-A-, (20) —CR$^{13}$R$^{'13}$—(CH$_2$)$_m$—CO—O—CR$^{15}$R$^{'15}$—C(=CH$_2$)—R$^{''15}$ or (21) —CO—O—CR$^{15}$R$^{'15}$—C(=CH$_2$)—R$^{''15}$ (wherein A represents —CO—CR$^{16}$=CH—R$^{17}$); a plurality of R$^2$s each represent an alkyl group having 6 to 18 carbon atoms, an alkenyl group having 2 to 6 carbon atoms, a phenyl group, a phenylalkyl group having 7 to 11 carbon atoms, COOR$^4$, CN, —NH—CO—R$^5$, a halogen atom, a trifluoromethyl group or —O—R$^3$; R$^3$ has the same meaning as R$^1$; R$^4$ represents an alkyl group having 1 to 18 carbon atoms, an alkenyl group having 3 to 18 carbon atoms, a phenyl group, a phenylalkyl group having 7 to 11 carbon atoms, a cycloalkyl group having 5 to 12 carbon atoms or an alkyl group with 3 to 50 carbon atoms which is interrupted by one or more of —O—, —NH—, —NR$^7$—, and —S— and/or may be substituted by a hydroxyl group, a phenoxy group or an alkylphenoxy group with 7 to 18 carbon atoms; R$^5$ represents a hydrogen atom, an alkyl group having 1 to 18 carbon atoms, an alkenyl group having 2 to 18 carbon atoms, a cycloalkyl group having 5 to 12 carbon atoms; a phenyl group, a phenylalkyl group having 7 to 11 carbon atoms, a bicycloalkyl group having 6 to 15 carbon atoms, a bicycloalkenyl group having 6 to 15 carbon atoms or a tricycloalkyl group having 6 to 15 carbon atoms; R$^6$ represents a hydrogen atom, an alkyl group having 1 to 18 carbon atoms, an alkenyl group having 3 to 18 carbon atoms, a phenyl group, a phenylalkyl group having 7 to 11 carbon atoms or a cycloalkyl group having 5 to 12 carbon atoms; $R^7$ and $R^8$ each represent an alkyl group having 1 to 12 carbon atoms, an alkoxyalkyl group having 3 to 12 carbon atoms, a dialkylaminoalkyl group having 4 to 16 carbon atoms or a cycloalkyl group having 5 to 12 carbon atoms; or $R^7$ and $R^8$ are taken together to form an alkylene group having 3 to 9 carbon atoms, an oxaalkylene group having 3 to 9 carbon atoms or an azaalkylene group having 3 to 9 carbon atoms; $R^9$ represents an alkyl group having 1 to 18 carbon atoms, an alkenyl group having 2 to 18 carbon atoms, a phenyl group, a cycloalkyl group having 5 to 12 carbon atoms, a phenylalkyl group having 7 to 11 carbon atoms, a bicycloalkyl group having 6 to 15 carbon atoms, a bicycloalkylalkyl group having 6 to 15 carbon atoms, a bicycloalkenyl group having 6 to 15 carbon atoms or a tricycloalkyl group having 6 to 15 carbon atoms; $R^{10}$ represents an alkyl group having 1 to 12 carbon atoms, a phenyl group, a naphthyl group or an alkylphenyl group having 7 to 14 carbon atoms; a plurality of $R^{11}$s each represent a hydrogen atom, an alkyl group having 1 to 18 carbon atoms, an alkenyl group having 3 to 6 carbon atoms, a phenyl group, a phenylalkyl group having 7 to 11 carbon atoms, a halogen atom or an alkoxy group having 1 to 18 carbon atoms; $R^{12}$ represents an alkyl group having 1 to 18 carbon atoms, an alkenyl group having 3 to 18 carbon atoms, a phenyl group, a phenyl group substituted by 1 to 3 substituents selected from an alkyl group having 1 to 8 carbon atoms, an alkoxy group having 1 to 8 carbon atoms, an alkenoxy group having 3 to 8 carbon atoms, a halogen atom, and a trifluoromethyl group, a phenylalkyl group having 7 to 11 carbon atoms, a cycloalkyl group having 5 to 12 carbon atoms, a tricycloalkyl group having 6 to 15 carbon atoms, a bicycloalkyl group having 6 to 15 carbon atoms, a bicycloalkylalkyl group having 6 to 15 carbon atoms, a bicycloalkenylalkyl group having 6 to 15 carbon atoms, —CO—$R^5$ or an alkyl group having 3 to 50 carbon atoms which is interrupted by one or more of —O—, —NH—, —$NR^7$—, and —S— and/or may be substituted by a hydroxyl group, a phenoxy group or an alkylphenoxy group having 7 to 18 carbon atoms; $R^{13}$ and $R^{'13}$ each represent a hydrogen atom, an alkyl group having 1 to 18 carbon atoms or a phenyl group; $R^{14}$ represents an alkyl group having 1 to 18 carbon atoms, an alkoxyalkyl group having 3 to 12 carbon atoms, a phenyl group or a phenylalkyl group having 1 to 4 carbon atoms in its alkyl moiety; $R^{15}$, $R^{'15}$, and $R^{''15}$ each represent a hydrogen atom or a methyl group; $R^{16}$ represents a hydrogen atom, —$CH_2$—COO—$R^4$, an alkyl group having 1 to 4 carbon atoms or CN; $R^{17}$ represents a hydrogen atom, —$COOR^4$, an alkyl group having 1 to 17 carbon atoms or a phenyl group; X represents —NH—, —$NR^7$—, —O—, —NH—$(CH_2)_p$—NH— or —O—$(CH_2)_q$—NH—; m represents a number of 0 to 19; n represents a number of 1 to 8; p represents a number of 0 to 4; and q represents a number of 2 to 4; with proviso that at least one of $R^1$, $R^2$, and $R^{11}$ contains two or more carbon atoms.

The substituents in formula (VII-A) will further be described.

The alkyl group as represented by $R^1$, $R^2$, $R^3$, $R^4$, $R^5$, $R^6$, $R^7$, $R^8$, $R^9$, $R^{10}$, $R^{12}$, $R^{13}$, $R^{14}$, $R^{16}$, and $R^{17}$ may be either straight-chain or branched. Examples of the alkyl group include methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, and octadecyl.

Examples of the cycloalkyl group having 5 to 12 carbon atoms as represented by $R^1$, $R^3$, $R^4$, $R^5$, $R^6$, $R^7$, $R^8$, $R^9$, and $R^{12}$ include cyclopentyl, cyclohexyl, cycloheptyl, cyclooctyl, cyclononyl, cyclodecyl, cycloundecyl, and cyclododecyl. Preferred of them are cyclopentyl, cyclohexyl, cyclooctyl, and cyclododecyl.

Examples of the alkenyl group as represented by $R^6$, $R^9$, $R^{11}$, and $R^{12}$ include, in particular, allyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl, and n-octadec-4-enyl.

The substituted alkyl, cycloalkyl or phenyl group may be mono- or poly-substituted and may carry a substituent at the binding carbon atom (in the α-position) or at other carbon atoms. Where a substituent is bonded at its hetero atom (for example, when an alkoxy group is bonded at its oxygen atom to an alkyl, cycloalkyl or phenyl group), it is preferably bonded to a position other than the α-position. The alkyl moiety of the substituted alkyl group preferably has two or more, more preferably three or more, carbon atoms. Two or more substituents are preferably bonded to different carbon atoms.

The alkyl group interrupted by —O—, —NH—, —$NR^7$— or —S— may be interrupted by two or more of the groups mentioned. In these cases, the two or more of the —O—, —NH—, —$NR^7$—, and —S— generally interrupt different carbon-carbon bonds and therefore do not make a hetero-hetero bond, such as —O—O—, —S—S— or —NH—NH—. Where the interrupted alkyl group is, in addition, substituted, the substituent is, in general, not at the α-position with respect to the hetero atom. Where two or more of the —O—, —NH—, —$NR^7$—, and —S—interrupt an alkyl group, they are usually the same.

The aryl group is generally an aromatic hydrocarbon group. Examples thereof include phenyl, biphenylyl, and naphthyl, with phenyl and biphenylyl being preferred. The aralkyl group is usually an alkyl group substituted by an aryl group, particularly a phenyl group. Accordingly, examples of the aralkyl group having 7 to 20 carbon atoms include benzyl, α-methylbenzyl, phenylethyl, phenylpropyl, phenylbutyl, phenylpentyl, and phenylhexyl. Examples of the phenylalkyl group having 7 to 11 carbon atoms preferably include benzyl, α-methylbenzyl, and α,α-dimethylbenzyl.

The alkylphenyl and alkylphenoxy groups are phenyl and phenoxy groups substituted with an alkyl group, respectively.

The halogen atom includes fluorine, chlorine, bromine, and iodine, with fluorine and chlorine being preferred. Chlorine is particularly preferred.

The alkylene group with 1 to 20 carbon atoms may be straight-chain or branched. Examples are methylene, ethylene, propylene, isopropylene, butylene, pentylene, and hexylene.

Examples of the cycloalkenyl group with 4 to 12 carbon atoms are 2-cyclobuten-2-yl, 2-cyclopenten-1-yl, 2,4-cyclopentadien-1-yl, 2-cyclohexen-1-yl, 2-cyclohepten-1-yl, and 2-cycloocten-1-yl.

Examples of the bicycloalkyl group having 6 to 15 carbon atoms include bornyl, norbornyl, and [2.2.2]bicyclooctyl, with bornyl and norbornyl being preferred. Bornyl and norborn-2-yl are more preferred.

Examples of the bicycloalkoxy group having 6 to 15 carbon atoms include bornyloxy and norborn-2-yloxy.

The bicycloalkyl-alkyl and -alkoxy groups with 6 to 15 carbon atoms are bicycloalkyl-substituted alkyl and alkoxy groups, respectively, both having a total carbon atom number of 6 to 15. Examples are norbornyl-2-methyl and norbornyl-2-methoxy.

Examples of the bicycloalkenyl group with 6 to 15 carbon atoms include norbornenyl and norbornadienyl, with norbornenyl, particularly norborn-5-enyl, being preferred.

The cycloalkenylalkoxy group with 6 to 15 carbon atoms is an alkoxy group substituted with a bicycloalkenyl group and contains 6 to 15 carbon atoms in total. Examples include norborn-5-enyl-2-methoxy.

Examples of the tricycloalkyl group having 6 to 15 carbon atoms include 1-adamantyl and 2-adamantyl, with 1-adamantyl being preferred.

Examples of the tricycloalkoxy group having 6 to 15 carbon atoms include adamantyloxy. The heteroaryl group having 3 to 12 carbon atoms is preferably pyridinyl, pyrimidinyl, triazinyl, pyrrolyl, furanyl, thiophenyl or quinolinyl.

Of the compounds represented by formula (VII-A) still preferred are those in which $R^1$ is (1) an alkyl group with 1 to 18 carbon atoms, (2) a cycloalkyl group with 5 to 12 carbon toms, (3) an alkenyl group having 3 to 12 carbon atoms, (4) a phenyl group, (5) an alkyl group with 1 to 18 carbon atoms substituted with a phenyl group, a hydroxyl group, an alkoxy group having 1 to 18 carbon atoms, a cycloalkoxy group having 5 to 12 carbon atoms, an alkenyloxy group having 3 to 18 carbon atoms, a halogen atom, —COOH, —COOR$^4$, —O—CO—R$^5$, —O—CO—O—R$^6$, —CO—NH$_2$, —CO—NHR$^7$, —CO—N(R$^7$)(R$^8$), CN, NH$_2$, NHR$^7$, —N(R$^7$)(R$^8$), —NH—CO—R$^5$, a phenoxy group, an alkylphenoxy group having 1 to 18 carbon atoms in the alkyl moiety, a phenylalkoxy group having 1 to 4 carbon atoms in the alkyl moiety, a bornyloxy group, a norborn-2-yloxy group, a norbornyl-2-methoxy group, a norborn-5-enyl-2-methoxy group or an adamantyloxy group, (6) a cycloalkyl group substituted with a hydroxyl group, an alkyl group with 1 to 4 carbon atoms, an alkenyl group with 2 to 6 carbon atoms and/or —O—CO—R$^5$, (7) a glycidyl group, (8) —CO—R$^9$, (9) —SO$_2$R$^{10}$, (10) an alkyl group with 3 to 50 carbon atoms interrupted by one or more oxygen atoms and/or substituted with a hydroxyl group, a phenoxy group or an alkylphenoxy group with 7 to 18 carbon atoms, (11) -A, (12) —CH$_2$—CH(XA)-CH$_2$-0-R$^{12}$, (13) —CR$^{13}$R$^{'13}$—(CH$_2$)$_m$—X-A-, (14) —CH$_2$—CH(OA)-R$^{14}$, (15) —CH$_2$—CH(OH)—CH$_2$—XA,

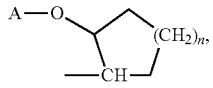
(16)

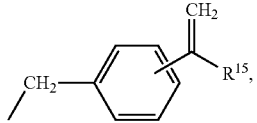
(17)

(18) —CR$^{15}$R$^{'15}$—C(=CH$_2$)—R$^{'''15}$, (19) —CR$^{13}$R$^{'13}$—(CH$_2$)$_m$—CO—X-A-, (20) —CR$^{13}$R$^{'13}$—(CH$_2$)$_m$—CO—O—CR$^{15}$R$^{'15}$—C(=CH$_2$)—R$^{'''15}$ or (21) —CO—O—CR$^{15}$R$^{'15}$—C(=CH$_2$)—R$^{'''15}$ (wherein A represents —CO—CR$^{16}$=CH—R$^{17}$); $R^2$ represents an alkyl group having 6 to 18 carbon atoms, an alkenyl group having 2 to 6 carbon atoms, a phenyl group, —O—R$^3$ or —NH—CO—R$^5$; $R^3$ has the same meaning as $R^1$; $R^4$ represents an alkyl group having 1 to 18 carbon atoms, an alkenyl group having 3 to 18 carbon atoms, a phenyl group, a phenylalkyl group having 7 to 11 carbon atoms, a cycloalkyl group having 5 to 12 carbon atoms or an alkyl group with 3 to 50 carbon atoms which is interrupted by one or more of —O—, —NH—, —NR$^7$—, and —S— and/or may be substituted by a hydroxyl group, a phenoxy group or an alkylphenoxy group with 7 to 18 carbon atoms; $R^5$ represents a hydrogen atom, an alkyl group having 1 to 18 carbon atoms, an alkenyl group having 2 to 18 carbon atoms, a cycloalkyl group having 5 to 12 carbon atoms; a phenyl group, a phenylalkyl group having 7 to 11 carbon atoms, a norborn-2-yl group, a norborn-5-en-2-yl group or an adamantyl group; $R^6$ represents a hydrogen atom, an alkyl group having 1 to 18 carbon atoms, an alkenyl group having 3 to 18 carbon atoms, a phenyl group, a phenylalkyl group having 7 to 11 carbon atoms or a cycloalkyl group having 5 to 12 carbon atoms; $R^7$ and $R^8$ each represent an alkyl group having 1 to 12 carbon atoms, an alkoxyalkyl group having 3 to 12 carbon atoms, a dialkylaminoalkyl group having 4 to 16 carbon atoms or a cycloalkyl group having 5 to 12 carbon atoms; or $R^7$ and $R^8$ are taken together to form an alkylene group having 3 to 9 carbon atoms, an oxaalkylene group having 3 to 9 carbon atoms or an azaalkylene group having 3 to 9 carbon atoms; $R^9$ represents an alkyl group having 1 to 18 carbon atoms, an alkenyl group having 2 to 18 carbon atoms, a phenyl group, a cycloalkyl group having 5 to 12 carbon atoms, a phenylalkyl group having 7 to 11 carbon atoms, a norborn-2-yl group, a norborn-5-en-2-yl group or an adamantyl group; $R^{10}$ represents an alkyl group having 1 to 12 carbon atoms, a phenyl group, a naphthyl group or an alkylphenyl group having 7 to 14 carbon atoms; a plurality of $R^{11}$s each represent a hydrogen atom, an alkyl group having 1 to 18 carbon atoms or a phenylalkyl group having 7 to 11 carbon atoms; $R^{12}$ represents an alkyl group having 1 to 18 carbon atoms, an alkenyl group having 3 to 18 carbon atoms, a phenyl group, a phenyl group substituted by 1 to 3 substituents selected from an alkyl group having 1 to 8 carbon atoms, an alkoxy group having 1 to 8 carbon atoms, an alkenoxy group having 3 to 8 carbon atoms, a halogen atom, and a trifluoromethyl group, a phenylalkyl group having 7 to 11 carbon atoms, a cycloalkyl group having 5 to 12 carbon atoms, a 1-adamantyl group, a 2-adamantyl group, a norbornyl group, a norbornyl-2-methyl group, —CO—R$^5$ or an alkyl group having 3 to 50 carbon atoms which is interrupted by one or more of —O—, —NH—, —NR$^7$—, and —S— and may be substituted by a hydroxyl group, a phenoxy group or an alkylphenoxy group having 7 to 18 carbon atoms; $R^{13}$ and $R^{'13}$ each represent a hydrogen atom, an alkyl group having 1 to 18 carbon atoms or a phenyl group; $R^{14}$ represents an alkyl group having 1 to 18 carbon atoms, an alkoxyalkyl group having 3 to 12 carbon atoms, a phenyl group or a phenylalkyl group having 1 to 4 carbon atoms in its alkyl moiety; $R^{15}$, $R^{'15}$, and $R^{'''15}$ each represent a hydrogen atom or a methyl group; $R^{16}$ represents a hydrogen atom, —CH$_2$—COO—R$^4$, an alkyl group having 1 to 4 carbon atoms or CN; $R^{17}$ represents a hydrogen atom, —COOR$^4$, an alkyl group having 1 to 17 carbon atoms or a phenyl group; X represents —NH—, —NR$^7$—, —O—, —NH—(CH$_2$)$_p$—NH— or —O—(CH$_2$)$_q$—NH—; m represents a number of 0 to 19; n represents a number of 1 to 8; p represents a number of 0 to 4; and q represents a number of 2 to 4.

The compounds of formulae (VII) and (VII-A) are synthesized by known processes for obtaining known compounds. For example, the compounds can be synthesized by Friedel-Crafts addition reaction of a halotriazine to a corresponding phenol in accordance with the process described in EP 434608 or H. Brunetti and C. E. Luthi, *Helv. Chim. Acta*, 55, 1566 (1972).

Examples of preferred compounds of formulae (VII) and (VII-A) are listed below for illustrative purposes only but not for limitation.

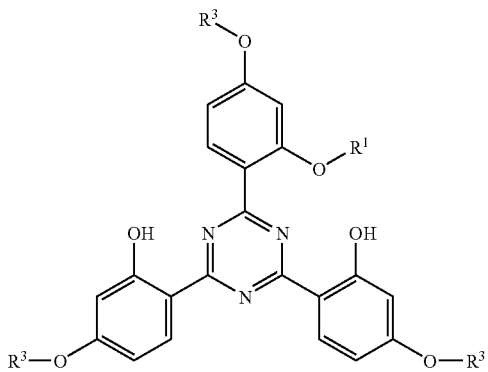

| Compound No. | R³ | R¹ |
|---|---|---|
| UV-1 | —CH₂CH(OH)CH₂OC₄H₉-n | —CH₃ |
| UV-2 | —CH₂CH(OH)CH₂OC₄H₉-n | —C₂H₅ |
| UV-3 | R³ = R¹: —CH₂CH(OH)CH₂OC₄H₉-n | |
| UV-4 | —CH(CH₃)—CO—O—C₂H₅ | —C₂H₅ |
| UV-5 | R³ = R¹: —CH(CH₃)—CO—O—C₂H₅ | |
| UV-6 | —C₂H₅ | —C₂H₅ |
| UV-7 | —CH₂CH(OH)CH₂OC₄H₉-n | —CH(CH₃)₂ |
| UV-8 | —CH₂CH(OH)CH₂OC₄H₉-n | —CH(CH₃)—C₂H₅ |
| UV-9 | R³ = R¹: —CH₂CH(C₂H₅)—C₄H₉-n | |
| UV-10 | —C₈H₁₇-n | —C₈H₁₇-n |
| UV-11 | —C₃H₇-n | —CH₃ |
| UV-12 | —C₃H₇-n | —C₂H₅ |
| UV-13 | —C₃H₇-n | —C₃H₇-n |
| UV-14 | —C₃H₇-iso | —CH₃ |
| UV-15 | —C₃H₇-iso | —C₂H₅ |
| UV-16 | —C₃H₇-iso | —C₃H₇-iso |
| UV-17 | —C₄H₉-n | —CH₃ |
| UV-18 | —C₄H₉-n | —C₂H₅ |
| UV-19 | —C₄H₉-n | —C₄H₉-n |
| UV-20 | —CH₂CH(CH₃)₂ | —CH₃ |
| UV-21 | —CH₂CH(CH₃)₂ | —C₂H₅ |
| UV-22 | —CH₂CH(CH₃)₂ | —CH₂CH(CH₃)₂ |
| UV-23 | n-hexyl | —CH₃ |
| UV-24 | n-hexyl | —C₂H₅ |
| UV-25 | n-hexyl | n-hexyl |
| UV-26 | —C₇H₁₅-n | —CH₃ |
| UV-27 | —C₇H₁₅-n | —C₂H₅ |
| UV-28 | —C₇H₁₅-n | —C₇H₁₅-n |
| UV-29 | —C₈H₁₇-n | —CH₃ |
| UV-30 | —C₈H₁₇-n | —C₂H₅ |
| UV-31 | —CH₂CHCH(CH₃)₂ | —CH₂CHCH(CH₃)₂ |
| UV-32 | —C₅H₁₁-n | —C₅H₁₁-n |
| UV-33 | —C₁₂H₂₅-n | —C₁₂H₂₅-n |
| UV-34 | —c₁₇H₃₅-n | —C₂H₅ |
| UV-35 | —CH₂—CO—O—C₂H₅ | —CH₂—CO—O—C₂H₅ |

Compounds that can be used in the invention in addition to the above-described UV absorbers include the light stabilizers listed in the catalog of Adecastab series as plastic additives by Asahi Denka Co, Ltd., the light stabilizers and UV absorbers listed in Tinuvin products list from Ciba Specialties, UV absorbers Seesorb, Seenox, and Seetec from Shipro Kasei Kaisya, the UV absorbers and antioxidants from Johoku Chemical Co., Ltd., Viosorb from Kyodo Chemical Co., Ltd., and the UV absorbers from Yoshitomi Pharmaceuticals Industries, Ltd.

As taught in JP-A 2001-187825, it is preferred to use (1) a benzotriazole UV absorbing compound whose melting point is 20° C. or lower, (2) a benzotriazole UV absorbing compound having an ester bond in the molecule thereof, (3) a combination of a UV absorbing compound whose melting point is below 20° C. and another UV absorbing compound whose melting point is above 20° C., or (4) a benzotriazole UV absorber having a partition coefficient of 9.2 or higher.

In particular, addition of the compound (1) or (4) described above produces an appreciable effect in reducing the wavelength dispersion of Rth value. Moreover, because the compound (4) is highly hydrophobic, addition of the compound (4) is also effective in suppressing bleed-out in film formation. The compound (4) preferably has a partition coefficient of 9.3 or higher.

The terminology "partition coefficient" denotes an octanol/water partition coefficient defined by equation:

$$\log Po/wPo/w = So/Sw$$

where So is the solubility of an organic compound in n-octanol at 25° C., and Sw is the solubility of the organic compound in pure water at 25° C.

The partition coefficient of a compound may be determined either by using n-octanol and water according to the equation above or, as in the present invention, using logP prediction software (CLOGP program provided by PCModels of Daylight Chemical Information Systems, Inc.).

It is also preferred in the present invention to use a UV absorber that shows a transmittance of 50% in a wavelength region of from 392 to 420 nm and a UV absorber that shows a transmittance of 50% in a wavelength region of from 360 to 390 nm, both measured as a 0.1 g/l solution in a solvent in a 1 cm cubic cell using the solvent as a blank.

The cellulose derivative film of the invention preferably contains the wavelength dispersion controlling agent to achieve optical isotropy over the whole visible region. It is preferred to increase the amount of the wavelength dispersion controlling agent to be added according as the degree of substitution of the cellulose derivative with the substituent having high polarizability anisotropy increases.

The amount of the wavelength dispersion controlling agent to be used in the cellulose derivative film is preferably 0.1% to 30%, more preferably 0.1% to 25%, even more preferably 0.1% to 20%, by weight based on the cellulose derivative.

The wavelength dispersion controlling agent can be added in the preparation of a cellulose derivative solution or may be added to a separately prepared cellulose derivative casting dope in any stage before casting. In the latter case, a solution of the cellulose derivative in a solvent (dope) and a solution containing the wavelength dispersion controlling agent and a small amount of the cellulose derivative are in-line mixed. An in-line mixer, such as an in-line static pipe mixer "Hi-Mixer" from Toray Engineering Co., Ltd., is preferably used. The wavelength dispersion controlling agent to be added may be a mixture with a matting agent or other additives such as a retardation controlling agent, a plasticizer, a deterioration inhibitor, and a release agent. In the case of using an in-line mixer, the dissolving is preferably carried out at high concentrations tinder high pressure. Any pressure container that withstands a prescribed pressure and allows for heating and agitation under pressure can be used. The pressure container is equipped with a pressure gauge, a thermometer, etc. as appropriate. Pressure application can be effected by introducing inert gas such as nitrogen or by heating to increase the vapor pressure of the solvent. The heating is preferably done from the outside the pressure container. A jacketed container is convenient for easy temperature control. The heating temperature of the solvent-containing system is preferably at or above the boiling point of the solvent but not so high as to bring the solvent to a boil. A suitable heating temperature will be from 30° to 150° C. The pressure is adjusted so that the solvent may not boil at the set temperature. After the dissolving, the solution is withdrawn from the container while being cooled or delivered by a pump, etc. to a heat exchanger, etc. where it is cooled. The solution may be cooled to ambient temperature. Or, the solution is cooled to a temperature 5° to 10° C. lower than the boiling point and subjected to solvent casting at that temperature, which is preferred to reduce the viscosity of the dope.

The cellulose derivative film preferably contains fine particle as a matting agent. Fine particles that can be used in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate, and calcium phosphate. Those containing silicon, particularly silicon dioxide, are preferred for turbidity reduction. It is preferred to use silicon dioxide particles having an average primary particle size of 20 nm or smaller, still preferably 5 to 16 nm, and an apparent specific gravity of 70 g/l or more, still preferably 90 to 200 g/l, even still preferably 100 to 200 g/l. The small primary particle size is advantageous for haze reduction. The high apparent specific gravity allows for preparation of a high concentration dispersion, which leads to reduction of haze and agglomerates.

The fine particles usually agglomerate to form secondary particles with an average particle size of 0.1 to 3.0 µm. In a film, the fine particles exist as agglomerates of the primary particles to provide the film with a surface unevenness of 0.1 to 3.0 µm. The secondary particle size is preferably 0.2 to 1.5 µm, more preferably 0.4 to 1.2 µm, even more preferably 0.6 to 1.1 µm. The circumscribed circle diameter of a primary or secondary particle under a scanning electron microscope is taken as a particle size of the particle. A total of 200 particles at different sites are measured to obtain an average particle size.

Commercially available silicon dioxide particles can be made use of, including AEROSIL R972, R972V, R974, R812, 200, 200V, 300, R202, OX50 and TT600 (all available from Nippon Aerosil Co., Ltd.). Commercially available zirconium oxide particles, such as AEROSIL R976 and R811 (both from Nippon Aerosil Co., Ltd.), are useful.

Among the commercial products, AEROSIL 200V and AEROSIL R972, which are silicon dioxide particles, are particularly preferred as having an average primary particle size of 20 nm or smaller and an apparent specific gravity of 70 g/l or more and being highly effective in reducing frictional coefficient of the film while maintaining low turbidity.

Some techniques are proposed in preparing a matting agent dispersion to obtain a cellulose derivative film containing small secondary particles of the matting agent. In a method, the fine particles of a matting agent and a solvent are mixed by stirring to prepare a dispersion. Separately, a cellulose derivative solution (dope) is prepared. The matting agent dispersion is added to a small portion of the cellulose derivative solution and dissolved by stirring, followed by mixing with the rest of the dope. According to this method, silicon dioxide particles can be dispersed well and hardly re-agglomerate. In another method, a small amount of a cellulose derivative is dissolved in a solvent by stirring, and the fine particles are added thereto and dispersed in a dispersing machine. The resulting dispersion is thoroughly mixed with the dope in an in-line mixer. The present invention is not restricted by these methods. In dispersing the silicon dioxide particles in a solvent or a solution, the silicon dioxide concentration is preferably 5% to 30% by weight, more preferably 10% to 25% by weight, even more preferably 15% to 20% by weight. A higher dispersion concentration results in a lower liquid turbidity for the amount of addition, leading to reductions in haze and agglomerates. The amount of the matting agent in the final cellulose derivative dope is preferably 0.01 to 1.0 g/m$^2$, more preferably 0.03 to 0.3 g/m$^2$, even more preferably 0.08 to 0.16 g/m$^2$.

The solvent to be used in the preparation of the matting agent dispersion preferably includes lower alcohols, such as methyl alcohol, ethyl alcohol, propyl alcohol, isopropyl alcohol, and butyl alcohol, and organic solvents that can be used in the cellulose derivative dope preparation (described infra).

In addition to the wavelength dispersion controlling agent, various additives, such as plasticizers, deterioration inhibitors, release agents, and IR absorbers, can be incorporated into the cellulose derivative film according to necessity. The additives may be either solid or oily. That is, they are not limited by melting point or boiling point. For example, a plasticizer having a solidification point lower than 20° C. and one having a solidification point of 20° C. or higher may be used in combination as suggested in JP-A 2001-151901. JP-A 2001-194522 can be referred to with respect to IR absorbers. While the additives may be added at any stage in the preparation of a dope, they are preferably added in the final stage of dope preparation. The amount of each of the additives to be added is not limited as long as the intended effect may be exerted. In the case where the cellulose derivative film has a multilayer structure, the kind and amount of additives may vary among the sublayers. The selection of kinds and amounts of additives in a cellulose derivative film is well-known in the art as described, e.g., in JP-A 2001-151902. Additional information about the additives is obtained from *Journal of Technical Disclosure*, No. 2001-1745, pp. 16-22, Japan Institute of Invention and Innovation, March, 2001.

The cellulose derivative film is preferably formed by solvent casting using a dope, a solution of the cellulose derivative in an organic solvent.

In a solvent casting process, as will be described, a dope is cast on a metal support and gelled into a half-dried web. In order to accelerate the gelation of the dope to facilitate peeling while improving the elastic modulus of the resulting cast film, it is preferred to use an organic solvent system containing at least two alcohol solvents to dissolve the cellulose derivative. The alcohol solvents include those having 1 to 8 carbon atoms. At least one of the two or more alcohol solvents to be combined is preferably an alcohol having 3 to 8 carbon atoms, more preferably one having 4 to 6 carbon atoms. The total alcohol solvent content in the solvent system is preferably 0.1% to 40%, more preferably 1.0% to 30%, even more preferably 2.0% to 20%.

The organic solvent that can be used as a main solvent of the solvent system is preferably selected from esters having 3 to 12 carbon atoms, ketones having 3 to 12 carbon atoms, ethers having 3 to 12 carbon atoms, and halogenated hydrocarbons having 1 to 7 carbon atoms. The esters, ketones and ethers may have a cyclic structure. Compounds having two or more functional groups selected from an ester group, a keto group, and an ether group (i.e., —O—, —CO—, and —COO—) are also useful as a main solvent. Other functional groups such as an alcoholic hydroxyl group may also be possessed. In the case of an organic solvent having two or more kinds of such functional groups, the number of the carbon atoms possessed by the solvent compound should fall within a range recited for compounds having any one of the functional groups. It is preferred to use, as a main solvent, a chlorine-containing organic solvent or an acetic ester, particularly methylene chloride or methyl acetate.

Both a solvent system containing a chlorine-containing halogenated hydrocarbon as a main solvent and a solvent system containing a chlorine-free organic solvent as a main solvent are useful in the invention. The latter solvent system is described in *Journal of Technical Disclosure*, No. 2001-1745, pp. 12-16.

Solvents for the cellulose derivative solution and film and dissolving methods that are preferably used in the invention are described in JP-A Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, and 11-60752. These patent documents furnish information about not only solvents preferable for dissolving the cellulose derivative of the invention but also properties of the solutions and substances that can be present in the solutions, which can be incorporated in the present invention to realize preferred embodiments.

The cellulose derivative solution (dope) can be prepared by any method, for example, a room-temperature dissolving method, a cooling dissolving method, a high-temperature dissolving method, or a combination thereof. Refer to *Journal of Technical Disclosure*, No. 2001-1745, pp. 22-25 with reference to the techniques for cellulose derivative dope preparation including concentration and filtration steps involved in dope preparation, which are preferably used in the invention.

The cellulose derivative dope preferably has a transparency of 85% or higher, more preferably 88% or higher, and even more preferably 90% or higher. In the present invention, it was confirmed that various additives sufficiently dissolved in the dope. The term "transparency" as used herein means a ratio of the absorbance of a dope at 550 nm to the absorbance of a blank (solvent only) at 550 nm, both measured on a 1 cm quartz cubic cell with a spectrophotometer UV-3150 manufactured by Shimadzu Ltd.

Solvent casting using a dope is preferably carried out using a method and equipment conventionally employed in the formation of a cellulose triacetate film.

A dope prepared in a dissolving vessel is once stored in a storage tank for defoaming. The thus obtained final dope is fed to a pressure die through a pressure pump, e.g., a constant displacement gear pump capable of precise metering by the number of rotations and uniformly cast through the slot of the pressure die on an endlessly moving metal support. When the dope on the support makes almost one revolution and reaches a peeling position, by which time the dope has half-dried, the half-dried dope called a web is peeled off the support. The web is dried while being conveyed by a tenter with its width fixed by clips, finally dried while moving on a group of pass rolls in a dryer, and taken up on a winder with a prescribed length. The combination of the tenter and the dryer having rolls is subject to alteration depending on the purpose. In making a functional protective film for application to electronic displays, which is the primary application of the cellulose derivative film of the invention, the solvent casting equipment is often combined with coaters to provide a functional layer, such as an undercoating layer, an antistatic layer, an anti-halation layer, or a protective layer, on the cast film. *Journal of Technical Disclosure*, No. 2001-1745, pp. 25-30 provides useful information on solvent casting under subtitles: casting (inclusive of co-casting), metal support, drying, peeling, and the like, which is preferably used in the invention.

The metal support generally includes an endless belt pulled over two drums and a rotating drum. From the standpoint of productivity, it is recommended to use a drum support having a controlled temperature and to use a dope containing at least two alcohol solvents as stated above, whereby the gelation of the dope is accelerated to improve peelability of the web.

The cellulose derivative film of the invention preferably has a thickness of 10 to 200 μm, more preferably 20 to 150 μm, even more preferably 30 to 100 μm.

To secure optical isotropy over a broad visible region, the cellulose derivative film preferably has a ratio of degree of alignment in the machine direction (MD) to that in a direction perpendicular to the machine direction, i.e., the transverse direction (TD), of 1:0.9 to 1.1. With the ratio falling within the above range, the film exhibits optical isotropy over a broad visible region. The ratio is preferably 1:0.93 to 1.07, more preferably 1:0.97 to 1.03.

The degree of alignment (alignment order parameter) Po over the total film thickness was measured by transmitted X-ray detection. X-rays were incident perpendicular to a sample. The transmitted X-rays were detected with an imaging plate. The peak intensity at 2θ=6° to 11° at a sample azimuth β is taken as I(β).

$$Po = (3\cos^2\beta - 1)/2 \tag{7}$$

where $$\cos^2\beta = \int_0^\Pi \cos^2\beta \cdot I(\beta) \cdot \sin\beta \, d\beta \bigg/ \int_0^\Pi I(\beta) \cdot \sin\beta \, d\beta$$

The ratio of the degree of alignment in the MD to the degree of alignment in a direction perpendicular to the MD can be controlled in a drying step after the web still having a volatile content is released from the support. For example, the ratio can be controlled through adjustments of a tenter stretch ratio, i.e., a stretch ratio in the TD (a direction perpendicular to the MD) and a shrinkage and/or a stretch ratio in the MD. The shrinkage and/or a stretch ratio in the MD is controlled by the peripheral rotational speed ratio of pass rolls.

Variations of the cellulose derivative film in optical properties with environmental changes are preferably such that the changes of Re(450), Re(700), Rth(450), and Rth(700) the film experiences when conditioned at 60° C. and 90% RH for 240 hours (high humidity conditioning) and those when the film is conditioned at 80° C. for 240 hours (high temperature conditioning) are both 0 to 15 nm, more preferably 0 to 12 nm, even more preferably 0 to 10 nm.

When the cellulose derivative film is conditioned at 80° C. for 240 hours, the amount of vaporization of the wavelength dispersion controlling agent that is preferably used in the cellulose derivative film (i.e., the compound having a spectral absorption maximum in a wavelength region of from 250 to 400 nm) from the film is preferably up to 30%, more preferably up to 25%, even more preferably up to 20%.

The amount of vaporization from a film is determined as follows. Each of a film conditioned at 80° C. for 240 hours and a film not conditioned is dissolved in a solvent, and the solution is analyzed by high performance liquid chromatography. The peak area of the compound of the chromatogram is taken as the amount of the compound remaining in the film. The amount of vaporization is calculated from equation:

Amount of vaporization (%)=[(amount of residual compound in sample not conditioned)−(amount of residual compound in sample conditioned)]/(amount of residual compound in sample not conditioned)×100

The cellulose derivative film has a glass transition temperature Tg of 80° to 165° C. In terms of heat resistance, the Tg of the film is preferably 100° to 160° C., more preferably 110° to 150° C. Measurement of Tg is carried out by calorimetry with a temperature rise of from room temperature up to 200° C. at a rate of 5° C./min using a differential scanning calorimeter (e.g., DSC 2910 form T.A. Instruments Inc.).

The cellulose derivative film preferably has a haze of 0.0% to 2.0%, more preferably 0.0% to 1.5%, even more preferably 0.0% to 1.0%. Transparency is an important property required of an optical film. The haze is measured for a specimen measuring 40 mm in width and 80 mm in length with a haze meter HGM-2DP (from Suga Test instruments Co., Ltd.) in accordance with JIS K6714.

The Re retardation and Rth retardation values of the cellulose derivative film (transparent substrate) are measured as follows. $Re(\lambda)$ and $Rth(\lambda)$ represent an in-plane and a thickness direction retardation values, respectively, at a wavelength $\lambda$. $Re(\lambda)$ is measured for the incidence of light having a wavelength of $\lambda$ nm in the direction normal to the film surface with a phase difference measurement system KOBRA 21ADH (from Oji Scientific Instruments).

$Rth(\lambda)$ is calculated by KOBRA 21ADH based on retardation values measured in three directions the first is the $Re(\lambda)$ obtained above, the second is a retardation measured for light of a wavelength $\lambda$ nm incident in a direction tilted (rotated) by +40° with respect to the normal direction of the film around the in-plane slow axis, which is decided by KOBRA 21ADH, as an axis of tilt (rotation), and the third is a retardation measured for light of a wavelength $\lambda$ nm incident in a direction titled (rotated) by −40° with respect to the normal direction of the film surface around the in-plane slow axis as an axis of tilt (rotation). A hypothetical value of average refractive index (1.48) and the thickness of the film are also inputted into KOBRA 21ADH. KOBRA 21ADH thus calculates nx, ny, and nz. Retardation values at such wavelengths that do not allow direct retardation measurements are obtainable by fitting using retardation values at neighboring wavelengths according to Cauchy's formula.

The cellulose derivative film has an absolute value of Re(589) (in-plane retardation at 589 nm) less than or equal to 10 nm (inequality (2)) and an absolute value of Rth(589) (thickness direction retardation at 589 nm) less than or equal to 25 nm (inequality (1)). Preferably, $|Re(589)| \leq 5$ nm and $|Rth(589)| \leq 20$ nm. More preferably, $|Re(589)| \leq 2$ nm and $|Rth(589)| \leq 15$ nm.

When the cellulose derivative of the invention is combined with the wavelength dispersion controlling agent (the compound having a spectral absorption maximum ($\lambda$max) in a wavelength region of from 250 to 400 nm), coloration of the resulting film can be prevented, and the wavelength dispersion of $Re(\lambda)$ and $Rth(\lambda)$ can be suppressed. As a result, the differences in Re and Rth between wavelengths 450 nm and 700 nm, i.e., $|Re(700)-Re(450)|$ and $|Rth(700)-Rth(450)|$, can be reduced.

The film with small wavelength dispersion preferably satisfies inequality: $|Rth(700)-Rth(450)| \leq 30$ nm, more preferably $|Rth(700)-Rth(450)| \leq 25$ nm, even more preferably $|Rth(700)-Rth(450)| \leq 15$ nm.

The difference $|Re(700)-Re(450)|$ is also desirably as small as possible. The film preferably satisfies inequality: $|Re(700)-Re(450)| \leq 10$ nm, more preferably $|Re(700)-Re(450)| \leq 5$ nm, and even more preferably $|Re(700)-Re(450)| \leq 3$ nm.

It is desirable for the cellulose derivative film to have little humidity dependence of both Re and Rth. Specifically, the $Re(\lambda)$ and $Rth(\lambda)$ of the film preferably satisfy the respective inequalities (4):

$$(Rth_A)-(Rth_B) \leq 30 \text{ nm and } (Re_A)-(Re_B) \leq 10 \text{ nm} \quad (4)$$

where $(Rth_A)$ is an Rth(589) under conditions of 25° C. and 10% RH; $(Rth_B)$ is an Rth(589) under conditions of 25° C. and 80% RH; $(Re_A)$ is an Re(589) under conditions of 25° C. and 10% RH; and $(Re_B)$ is an Re(589) under conditions of 25° C. and 80% RH.

$[(Rth_A)-(Rth_B)]$ is more preferably 0 to 25 nm, even more preferably 0 to 20 nm. $[(Re_A)-(Re_B)]$ is more preferably 0 to 8 nm, even more preferably 0 to 5 nm.

For applications as a protective film for a polarizer of a polarizing plate, the cellulose derivative film has a preferred range of equilibrium water content in order not to impair adhesion to a water soluble polymer such as PVA and to secure durability of a polarizing plate against high temperature and humidity. Regardless of its thickness, the film preferably has an equilibrium water content of 0.1% to 3.0%, more preferably 0.1% to 2.5%, even more preferably 0.1% to 2.0%, at 25° C. and 80% RH. With the equilibrium water content controlled within the preferred range, the film provides a polarizing plate that undergoes reduced change in polarizing performance under a high temperature and humidity condition.

The equilibrium water content is measured on a sample film measuring 7 mm in width and 35 mm in length and having been conditioned at 25° C. for 80% RH for at least 6 hours by the Karl Fischer method with a moisture meter CA-03 and an vaporizer VA-05 (both manufactured by Mitsubishi Chemical Corp.). The water content (g) as measured is divided by the sample weight (g).

In the present invention, the cellulose derivative film was evaluated in terms of transmittance and surface energy as follows.

Measurement of Transmittance:

A transmittance of visible light (615 nm) through a sample film measuring 20 mm by 70 mm is measured at 25° C. and 60% RH with a transparency meter (AKA Photoelectric Colorimeter, available from Kotaki Seisakusyo).

Measurement of Surface Energy:

A sample is put on a horizontal table, and given amounts of water and methylene iodide are separately placed on the sample. After an elapse of a given time, the contact angle of the sample surface with each of water and methylene iodide are measured. The surface energy is obtained from the measured contact angles by the Owens method.

The in-plane variations of the retardation of the cellulose derivative film are preferably such that the following inequalities are satisfied.

$$|Re_{(MAX)}-Re_{(MIN)}| \leq 3 \text{ and } |Rth_{(MAX)}-Rth_{(MIN)}| \leq 5$$

where $Re_{(MAX)}$ and $Rth_{(MAX)}$ are maximum Re and Rth values, respectively, of a 1 m-side square piece arbitrarily cut out of the film; and $Re_{(MIN)}$ and $Rth_{(MIN)}$ are minimum Re and Rth values, respectively, of the cut piece.

The cellulose derivative film is required to retain various compounds incorporated therein. Specifically, when the film is left to stand at 80° C. and 90% RH for 48 hours, the weight change of the film is preferably up to 5%, more preferably up to 3%, even more preferably up to 2%. The film's ability to retain added compounds (hereinafter "retention") is measured as follows. A test piece measuring 10 cm by 10 cm is conditioned at 23° C. and 55% RH for 24 hours and weighed. The test piece is then allowed to stand at 80±5° C. and 90±10% RH for 48 hours, lightly wiped, and weighed. The retention is calculated from equation:

Retention (%)=[(weight before standing−weight after standing)/weight before standing]×100

The cellulose derivative film of the present invention is useful for optical applications and applications to photographic light-sensitive materials. Of optical applications, the film is particularly suited for applications to LCDs, especially LCDs of the type comprising a liquid crystal cell (a liquid crystal layer sandwiched in between electrode substrates), a polarizing plate on each side of the liquid crystal cell, and at least one optically anisotropic layer between the liquid crystal cell and the polarizing plate. LCD modes of that type include TN, IPS, FLC, AFLC, OCB, STN, ECB, VA, and HAN, with IPS and VA being particularly preferred.

For use in optical applications, the cellulose derivative film can be provided with various functional layers, such as an antistatic layer, a cured resin layer (transparent hard coat layer), an anti-reflective layer, an adhesion enhancing layer, an antiglare layer, an optical compensation layer, an alignment layer, and a liquid crystal layer. The functional layers to which the cellulose derivative film of the invention is applicable and materials for forming the functional layers include surface active agents, slip agents, matting agents, an antistatic layer, and a hard coat layer. Additional information on the functional groups is obtained from *Journal of Technical Disclosure*, No. 2001-1745, pp. 32-45, which can preferably be used in the present invention.

Applications of the cellulose derivative film of the invention will further be described.

The cellulose derivative film is particularly useful as a protective film of a polarizing plate. A polarizing plate is composed of a polarizer and a protective film on both sides of the polarizer. The polarizing plate can further has a releasable protective sheet on one side thereof and a separate sheet on the other side. Both the releasable protective sheet and the separate sheet provide the polarizing plate with a protection during shipment or inspection of the polarizing plate. The separate sheet is for covering the adhesive layer with which the polarizing plate is bonded to the liquid crystal cell, while the protective sheet is for protecting the opposite side of the polarizing plate.

Examples of the polarizer include films of coating type typified by Optiva polarizers and films of orientation type. The film of orientation type comprises a binder and either iodine or a dichroic dye.

The film of orientation type develops the function as a polarizer with the iodine or dichroic dye molecules oriented in the binder. Molecular orientation is preferably achieved by orienting the iodine or dichroic dye molecules along the binder molecules or inducing the dichroic dye molecules to self-organize to be oriented in a certain direction like liquid crystal molecules.

Widespread polarizers are generally prepared by immersing a stretched polymer film in a bath of iodine or dichroic dye solution to make the iodine or dichroic dye penetrate into the binder. Commonly available polarizers have iodine or a dichroic dye distributed from each side thereof to a depth of approximately 4 μm (to a total penetration thickness of about 8 μm). In order to obtain sufficient polarizing performance, however, it is preferred for the polarizer to have a total penetration thickness of at least 10 μm. The degree of penetration can be controlled by adjusting the concentration of the iodine or dichroic dye solution, the bath temperature and/or the immersing time.

The binder of the polarizer may be crosslinked. A polymer crosslinkable by itself can be used as the binder. A polymer which originally has a functional group or to which a functional group has been introduced crosslinks on light or heat application or changing pH to form a polarizer membrane.

Otherwise, a polymer may be crosslinked with a crosslinking agent. By use of a crosslinking agent, which is a highly reactive compound, a bonding group derived from the crosslinking agent is introduced between the binder molecules to form a crosslinked structure.

Crosslinking is usually carried out by applying a coating solution containing a crosslinkable polymer or a mixture of a polymer and a crosslinking agent to a transparent substrate, followed by heating to induce crosslinking reaction. The reaction may be caused at any stage before the final step of making a polarizing plate, so long as the resultant polarizer has sufficient durability.

Polymers crosslinkable either by itself or with a crosslinking agent can be used. Examples of the polymers include polymethyl methacrylate, polyacrylic acid, polymethacrylic acid, polystyrene, gelatin, polyvinyl alcohol, modified polyvinyl alcohol, poly(N-methylolacrylamide), polyvinyltoluene, chlorosulfonated polyethylene, nitrocellulose, chlorinated polyolefin (e.g., polyvinyl chloride), polyester, polyimide, polyvinyl acetate, polyethylene, carboxymethyl cellulose, polypropylene, polycarbonate, and copolymers thereof (e.g., acrylic acid-methacrylic acid copolymer, styrene-maleimide copolymer, styrene-vinyltoluene copolymer, vinyl acetate-vinyl chloride copolymer, and ethylene-vinyl acetate copolymer). Preferred of them are water-soluble polymers (e.g., poly(N-methylolacrylamide), carboxymethyl cellulose, gelatin, polyvinyl alcohol, and modified polyvinyl alcohol). Gelatin, polyvinyl alcohol, and modified polyvinyl alcohol are more preferred. Polyvinyl alcohol and modified polyvinyl alcohol are even more preferred.

The saponification degree of the polyvinyl alcohol or modified polyvinyl alcohol is preferably in the range of from 70% to 100%, more preferably in the range of from 80% to 100%, even more preferably in the range of from 95% to 100%. The polymerization degree of the polyvinyl alcohol is preferably in the range of from 100 to 5,000.

The modified polyvinyl alcohol is obtained by incorporating a modifying group into polyvinyl alcohol through copolymerization, chain transfer or block polymerization. Examples of modifying groups introduced by copolymerization include COONa, $Si(OH)_3$, $N(CH_3)_3Cl$, $C_9H_{19}COO$, $SO_3Na$, and $C_{12}H_{25}$. Examples of modifying groups introduced by chain transfer include COONa, SH, and $SC_{12}H_{25}$. The polymerization degree of the modified polyvinyl alcohol is preferably 100 to 3,000. For more information on the modified polyvinyl alcohol, reference can be made to JP-A Nos. 8-338913, 9-152509, and 9-316127.

Unmodified or alkylthio-modified polyvinyl alcohols having saponification degrees of 85% to 95% are particularly preferred.

Two or more modified or unmodified polyvinyl alcohols may be used in combination.

The more the crosslinking agent is added to the binder, the more the durability of the resulting polarizer against moisture and heat is improved. Nevertheless, if the amount of the crosslinking agent is 50% by weight or more based on the binder, the iodine or dichroic dye molecules are poorly aligned. Accordingly, the amount of the crosslinking agent to be added is preferably 0.1% to 20% by weight, more preferably 0.5% to 15% by weight, based on the binder.

After completion of the crosslinking reaction, the binder still contains unreacted crosslinking agent a little. The amount of the unreacted crosslinking agent remaining in the binder is preferably not more than 1.0% by weight, more preferably not more than 0.5% by weight, based on the amount of the binder. If a polarizer with a considerable amount of residual crosslinking agent is installed in an LCD and used for a long time or left under hot and humid conditions, it can undergo reduction in polarization degree. The crosslinking agents that can be used in the invention are described in U.S. Reissue Patent 23,297. Boron compounds (e.g., boric acid and borax) are also usable as a crosslinking agent.

Examples of the dichroic dye include azo dyes, stilbene dyes, pyrazolone dyes, triphenylmethane dyes, quinoline dyes, oxazine dyes, thiazine dyes, and anthraquinone dyes. Water-soluble dyes are preferred. The dichroic dye preferably has a hydrophilic group (e.g., sulfo, amino or hydroxyl). Specific examples of the dichroic dye are C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. For more information on dichroic dyes, reference can be made to JP-A Nos 1-161202, 1-172906, 1-172907, 1-183602, 1-248105, 1-265205, and 7-261024. The dichroic dye is used in the form of a free acid or a salt with an alkali metal, ammonium or an amine. Two or more dichroic dyes may be used in combination to make a polarizer with a desired hue. A dichroic dye or a mixture of two or more dichroic dyes which provides a black hue when polarizing axes are perpendicularly crossed is preferred. The polarizer and the polarizing plate comprising such a dichroic dye or a mixture of dichroic dyes are excellent in both single polarizer transmittance and polarization degree.

In the present invention, transmittance of a single polarizing plate (Tt), of a parallel pair of polarizing plates (Tp), and of a crossed pair of polarizing plates (Tc) are measured with UV3100PC (from Shimadzu Corp.). Measurements are made under environmental conditions of 25° C. and 60% RH over a wavelength range of from 380 to 780 nm. Measurements were repeated 10 times for each of Tt, Tp, and Tc to obtain the respective averages.

A polarizing plate can be tested for durability using (1) two samples each prepared by superposing two polarizing plates crosswise or in parallel with their optical compensation film side facing inside and (2) two samples (about 5 cm by 5 cm) each composed of a single polarizing plate bonded to a glass plate via a pressure-sensitive adhesive, with the optical compensation film side facing inside. The transmittance of a single polarizing plate (Tt) is measured using each of the two glass-supported samples with its polarizing plate side facing a light source to obtain an average. Favorable polarizing performance of the polarizing plate is $40.0 \leq Tt \leq 45.0$, $30.0 \leq Tp \leq 40.0$, and $Tc \leq 2.0$; more favorably $40.2 \leq Tt \leq 44.8$, $32.2 \leq Tp \leq 39.5$, and $Tc \leq 1.6$; and even more favorably $41.0 \leq Tt \leq 44.6$, $34 \leq Tp \leq 39.1$, and $Tc \leq 1.3$.

The degree of polarization (polarization P) is calculated from these transmittances. The higher the polarization P, the less the light leakage from crossed polarizers, showing high performance as a polarizing plate. The polarization P is preferably 95.0% or higher, more preferably 96.0% or higher, even more preferably 97.0% or more.

The polarizing plate of the present invention preferably has crossed pair transmittance characteristics such that at least one of inequalities (e), (f), and (g) below is satisfied, in which a crossed pair transmittance at a wavelength λ is expressed by Tc(λ).

$$Tc(380) \leq 2.0 \tag{e}$$

$$Tc(410) \leq 1.0 \tag{f}$$

$$Tc(700) \leq 0.5 \tag{g}$$

More preferably, $Tc(380) \leq 1.95$, $Tc(410) \leq 0.9$, $Tc(700) \leq 0.49$; even more preferably, $Tc(380) \leq 1.90$, $Tc(410) \leq 0.8$, $Tc(700) \leq 0.48$.

When the polarizing plate is allowed to stand at 60° C. and 95% RH for 650 hours, it is preferred that at least one of changes in crossed pair transmittance (ΔTc) and polarization (ΔP) fall within the respective inequalities (h) and (i):

$$-0.6 \leq \Delta Tc \leq 0.6 \tag{h}$$

$$-0.3 \leq \Delta P \leq 0.0 \tag{i}$$

When the polarizing plate is allowed to stand at 80° C. for 650 hours, it is preferred that at least one of changes in crossed pair transmittance (ΔTc) and polarization (ΔP) fall within the respective inequalities (h) and (i):

$$-0.6 \leq \Delta Tc \leq 0.6 \tag{h}$$

$$-0.3 \leq \Delta P \leq 0.0 \tag{i}$$

It is preferred for the polarizing plate to undergo as small changes as possible in crossed pair transmittance (ΔTc) and polarization (ΔP) before and after a durability test.

An ordinary LCD has a liquid crystal cell sandwiched between two polarizing plates, and the cellulose derivative film of the invention is effective as a protective film of the polarizing plates to secure excellent display qualities no matter where it is provided. The cellulose derivative protective film is especially suited to be applied to the viewer's side of the polarizing plate because the protective film on that side is provided with a transparent hard coat layer, an antiglare layer, an anti-reflective layer, and the like.

In making the polarizing plate of the invention using the cellulose derivative film as a polarizer protective film, it is necessary to enhance the adhesiveness of the protective film to a polyvinyl alcohol-based polarizer. With poor adhesion, the polarizing plate would have poor fabricability in assembling into a panel for an LCD, etc. or insufficient durability that can lead to troubles in long-term use, such as interlaminar separation. A pressure-sensitive adhesive can be used to adhere the protective film to a polarizer. Useful adhesives include PVA adhesives such as PVA and polyvinyl butyral and vinyl latices such as butyl acrylate. Surface energy is a measure of adhesion. That is, better adhesion between a protective film and a polarizer, which leads to better fabricability and durability of the resulting polarizing plate, is obtained where the surface energy of the protective film is closer to that of PVA (the main component of the polarizer) or that of an adhesive layer comprising a pressure-sensitive adhesive containing, as a main component, a PVA-based adhesive or a vinyl latex. Therefore, the adhesion of a protective film to a polarizer or an adhesive layer can sufficiently be enhanced by increasing the surface energy of the protective film by surface treatments, such as hydrophilization treatments.

The cellulose derivative film is usually more hydrophobic than the cellulose derivative itself because it contains additives such as a compound for reducing optical anisotropy and a wavelength dispersion controlling agent. Therefore, it needs hydrophilization treatment to improve its adhesion to provide a polarizing plate with improved fabricability and durability.

The cellulose derivative film before being subjected to surface treatment, which is less hydrophilic than the cellulose derivative itself due to the additives it contains, preferably has a surface energy of 30 to 50 mN/m, more preferably 40 to 48 mN/m, taking into consideration humidity dependence of the optical and dynamic characteristics of the film and ease of adhesion enhancing surface treatment. The film with a surface energy of 30 mN/m or more exhibits satisfactory film properties in good balance with productivity. For the film to have a surface energy of 50 mN/m or less gives rise to no problem in terms of hydrophilicity of the film itself and humidity dependence of the optical and dynamic characteristics of the film.

Seeing that the surface energy of a PVA film ranges from 60 to 80 mN/m while somewhat varying according to the additives, the degree of drying, and the pressure-sensitive adhesive applied thereto, it is desirable that the cellulose derivative film be surface treated so as to have a surface energy in that range, more preferably 60 to 75 mN/m, even more preferably 65 to 75 mN/m, on its side to be bonded to a PVA-based polarizer.

The surface treatment for hydrophilization can be performed by known processes, such as a corona discharge treatment, a glow discharge treatment, a UV irradiation treatment, a flame treatment, an ozone treatment, an acid treatment, and an alkali saponification treatment. The glow discharge treatment as referred to here may be a low-temperature plasma treatment under a low gas pressure (e.g., $10^{-3}$ to 20 Torr (0.133 to 2660 Pa)) or a plasma treatment under atmospheric pressure. Gases that can be excited to form a plasma under such conditions include argon, helium, neon, krypton, xenon, nitrogen, carbon dioxide, and freons, e.g., tetrafluoromethane, and mixtures thereof. More detailed information about the glow discharge treatment is given in *Journal of Technical Disclosure*, No. 2001-1745, pp. 30-32, which is preferably applied to the present invention.

Preferred of the surface treatments is an alkali saponification treatment. It is extremely effective on a cellulose acylate film. The treatment can be carried out by (1) an immersion method or (2) a coating method.

The immersion method comprises immersing the film in an alkali solution under proper conditions to cause all the alkali-reactive surface sites to be saponified. Needing no special equipment, this method is economically advantageous. A sodium hydroxide aqueous solution is preferably used as an alkali solution. The alkali solution preferably has a concentration of 0.5 to 3 mol/l, more preferably 1 to 2 mol/l, and a temperature of 25° to 70° C., more preferably 30° to 60° C.

After the immersion, the film is thoroughly rinsed with water or immersed in a dilute acid solution for neutralization so as to remove any alkali component.

By this saponification treatment, the film is hydrophilized on its both sides. For use as a polarizer protective film, the thus surface treated film is adhered on either of its hydrophilized sides to a polarizer to make a polarizing plate.

The hydrophilized surface of the film exhibits improved adhesion to a PVA-based polarizer.

Where the cellulose derivative protective film has an anti-reflective layer on one side thereof, not only the side to be adhered to a polarizer but also the anti-reflective layer receives the attack of an alkali agent. In that case, therefore, the immersing conditions should be minimal. The damage to the anti-reflective layer caused by the alkali is judged by the contact angle with water of the opposite side. When the substrate is cellulose triacetate, the contact angle with water of the side to be adhered to a polarizer is preferably 20° to 50° C., more preferably 30° to 50° C., even more preferably 40° to 50° C., As long as the water contact angle of the film surface opposite to the anti-reflective layer is within the recited range after the alkali saponification treatment, an improved adhesion to a polarizer can be secured without substantial damage to the anti-reflective layer.

The coating method, another technique for alkali saponification, comprises applying an alkali solution to a selected side of a film under proper conditions. The coating method is preferred when the protective film has an anti-reflective layer on its one side because the alkali solution can be applied only to the side to be adhered to a polarizer thereby to avoid damage to the anti-reflective layer. For the details of the alkali solution and procedures, reference can be made to JP-A 2002-82226 and WO02/46809. Requiring coating equipment, the coating method is less advantageous than the immersion method from the viewpoint of cost.

The plasma treatment that can be used in the invention includes a vacuum glow discharge treatment, an atmospheric pressure glow discharge treatment, and a flame plasma treatment. These treatments can be carried out by the methods taught in JP-A 6-123062, JP-A 11-293011, and JP-A 11-5857.

A plastic film treated in a plasma is endowed with strong hydrophilicity. A plasma treatment is conducted, for example, as follows. A film to be treated is placed between facing electrodes in a plasma generator, and a plasma generating gas is introduced into the plasma generator. On applying a radiofrequency voltage between the electrodes, the gas is excited to generate a plasma to cause a glow discharge between the electrodes. An atmospheric pressure glow discharge treatment is preferred.

A corona discharge treatment is the most popular among others and can be carried out by any of conventionally known methods, for example, the methods disclosed in JP-A 48-5043, JP-B 47-51905, JP-A 47-28067, JP-A 49-83767, JP-A 51-41770, and JP-A 51-131576 A. Corona discharge treaters commercially available as a means for modifying the surface of plastic films, etc. can be used. Inter alia, a corona generator having a multi-blade electrode system supplied by Softal Electronic GmbH is preferably used for the following reasons. The Softal's generator has a number of electrodes with air blown between the electrodes, which structure prevents a treated web from being heated and eliminates by-produced low molecular substances from the web surface being treated. As a result, very high energy efficiency is reached to achieve high corona treatment.

Before the cellulose derivative film is used as polarizer protective film, etc., it is necessary to control the surface energy of at least one side of the film within an appropriate range, which can be accomplished by the surface treatment as stated above. On the other hand, the surface treatment on the cellulose derivative film can cause the additives present in the film to vaporize, leach, and/or decompose, resulting in reductions of optical performance, film performance, and durability. Besides, vaporization and leaching of the additives would contaminate the processing system, eventually making continuous processing impossible. It is therefore important to minimize reduction of the amount of the additives during the surface treatment. The change in total amount of the additives due to the surface treatment is preferably 0.2% at the most, more preferably 0.1% or less, even more preferably 0.01% or less, based on the total amount of the additives existing before the treatment.

The cellulose derivative film of the invention has broad applications. It is especially effective when applied to an optical compensation film of LCDs. An optical compensation film is an optical element that is generally used in LCDs to compensate a phase difference and is also called a retardation film, an optical compensation sheet, etc. An optical compensation film has birefringence that is taken advantage of to remove coloring of the screen or to enhance the viewing angle. Having small optical anisotropy ($|Re(589)| \leq 10$ nm and $|Rth(589)| \leq 25$ nm) and preferably having small wavelength dispersion ($|Rth(700)-Rth(450)| \leq 30$ nm and $|Re(700)-Re(450)| \leq 10$ nm), the cellulose derivative film of the invention is free from unnecessary anisotropy. Therefore, when combined with an optically anisotropic, birefringent layer, it is capable of providing a laminate manifesting only the optical performance of the optically anisotropic layer.

When the cellulose derivative film is used as a substrate of an optical compensation film of an LCD, the optically anisotropic layer to be used in combination preferably has Re(589) of 0 to 200 nm and |Rth(589)| of 0 to 400 nm. Any optically anisotropic layer may be used as long as the retardation values are within the above ranges. Any optically anisotropic layer demanded as an optical compensation film may be used irrespective of the optical performance or the driving system of the liquid crystal cell of an LCD in which the cellulose derivative film is used. The optically anisotropic layer may be formed of a composition containing a liquid crystal compound or a birefringent polymer film.

The liquid crystal compound that can be used to form the optically anisotropic layer is preferably a discotic liquid crystal compound or a rod-like liquid crystal compound.

Discotic liquid crystal compounds that can be used in the present invention are described in various references including C. Destrade et al., *Mol. Liq. Cryst.*, vol. 71, p. 111 (1981), The Chemical Society of Japan (ed.), *Kikan Kagaku Sosetsu*, No. 11, Ekisyo no Kagaku, Ch. 5, Ch. 10, Sec. 2 (1994), B. Kohne et al., *Angew. Chem. Soc. Chem. Comm.*, p. 1794 (1985), and J. Zhang et al., *J. Am. Chem. Soc.*, vol. 116, p. 2655 (1994).

The discotic liquid crystal molecules in the optically anisotropic layer are preferably fixed in an aligned state. Fixing an aligned state is preferably effected by polymerization. JP-A 8-27284 teaches polymerization of discotic liquid crystal compounds. In order for discotic liquid crystal molecules to be fixed by polymerization, the molecules must have the discotic core thereof substituted with a polymerizable group. If a polymerizable group is directly bonded to the discotic core, however, it is difficult to keep the aligned state during polymerization reaction. Hence, a linking group is introduced between the discotic core and a polymerizable group. For the details of the discotic liquid crystal molecules, JP-A 2001-4387 can be referred to.

Examples of rod-like liquid crystal compounds that can be used in the invention include azomethines, azoxy compounds, cyanobiphenyls, cyanophenyl esters, benzoic esters, phenyl cyclohexanecarboxylates esters, cyanophenylcyclohexanes, cyano-substituted phenylpyrimidines, alkoxy-substituted phenylpyrimidines, phenyldioxanes, tolans, and alkenylcyclohexylbenzonitriles. Not only low molecular liquid crystal compounds as recited but high molecular liquid crystal compounds are useful as well.

The rod-like liquid crystal molecules in the optically anisotropic layer are preferably fixed in an aligned state. Fixing an aligned state is preferably effected by polymerization. Examples of polymerizable rod-like liquid crystal compounds that can be used in the invention are described in *Makromol. Chem.*, vol. 190, p. 2255 (1989), *Advanced Materials*, vol. 5, p. 107 (1993), U.S. Pat. Nos. 4,683,327, 5,622,648, and 5,770,107, WO 95/22586, 95/24455, 97/00600, 98/23580, 98/52905, and JP-A Nos. 1-272551, 6-16616, 7-110469, 11-80081, and 2001-328973.

As stated, the optically anisotropic layer may be formed of a polymer film, a film of a polymer capable of developing optical anisotropy. Examples of such a polymer include polyolefins (e.g., polyethylene, polypropylene, and norbornene polymers), polycarbonate, polyarylate, polysulfone, polyvinyl alcohol, polymethacrylic esters, polyacrylic esters, and cellulose esters (e.g., cellulose triacetate and cellulose diacetate). Copolymers or polyblends of these polymers are also employable.

The optical anisotropy of a polymer film is preferably such that is caused by an extension treatment, such as stretching. Stretching is preferably uniaxial or biaxial stretching. Stretching includes longitudinal uniaxial stretching making use of a difference in peripheral speed between two or more rolls, tenter stretching (widthwise stretching of a film gripped by the edges in a tenter frame), or a combination thereof, i.e., biaxial stretching. Tenter stretching or biaxial stretching is more preferred from the standpoint of productivity of the optical compensation film and the polarizing plate as hereinafter described. Two or more polymer films may be used so that the conditions described above may be fulfilled as a whole. The polymer film is preferably produced by solvent casting to have minimized unevenness of birefringence. The polymer film preferably has a thickness of 20 to 500 μm, more preferably 40 to 100 μm.

The optically anisotropic layer formed of a polymer film can be prepared by spreading a polymer in liquid form (e.g., as dissolved in a solvent) on the cellulose derivative film, drying the web, and subjecting the resulting laminate to a treatment for orienting the polymer molecules in the plane. The molecular orientation treatment includes an extension treatment and/or a contraction treatment, preferably an extension treatment in view of productivity and ease of control.

The polymer making the optically anisotropic layer is not particularly limited, and one or more than one polymers with appropriate transparency can be used. A polymer capable of forming a transparent film having a transmittance of 75% or more, particularly 85% or more, is preferred. From the viewpoint of stable, large-volume productivity of film, preferred is a solid polymer showing positive birefringence that provides a large retardation in the stretching direction.

Examples of such a solid polymer include polyamide and polyester (JP-T 10-508048); polyimide (JP-T 2000-511296); polyether ketone and polyaryl ether ketone (JP-A 2001-49110); polyamide-imide (JP-A 61-162512); and polyester imide (JP-A 64-38472). One or more than one of these solid polymers can be used to form a birefringent film. The molecular weight of the solid polymer is not particularly limited but is usually 2000 to 1,000,000, preferably 1500 to 750,000, more preferably 1000 to 500,000, in view of film forming properties.

Various additives such as stabilizers, plasticizers, and metals can be incorporated into the polymer film according to necessity. The solid polymer can be converted to a liquid form by an appropriate means such as heating to melt or dissolving in a solvent.

The liquid polymer spread on the cellulose derivative film is solidified by cooling in the case of using the polymer melt or by drying to evaporate the solvent in the case of using the polymer solution. The step of drying can be performed in an appropriate system, such as spontaneous drying (air drying), heat drying (particularly at 40° to 200° C.), vacuum drying, and a combination thereof. Using a polymer solution is advantageous over the use of a melt in terms of production efficiency and suppression of development of optical anisotropy.

The solvent to be used to prepare a polymer solution is chosen as appropriate from methylene chloride, cyclohexanone, trichloroethylene, tetrachloroethane, N-methylpyrrolidone, tetrahydrofuran, etc. and mixtures thereof. A suitable polymer concentration providing a suitable viscosity for film formation is 2 to 100 parts, preferably 5 to 50 parts, more preferably 10 to 40 parts, by weight per 100 parts by weight of a solvent.

Various film forming techniques can be adopted to spread the polymer in liquid form, such as spin coating, roll coating, flow coating, printing, dipping, casting, bar coating, gravure coating, and extrusion coating. Film forming techniques using a polymer solution typified by solvent casting are preferred from the standpoint of large-volume productivity of a film free from thickness unevenness and orientation strain unevenness. It is particularly preferred that the cellulose derivative film and the polymer film be formed by co-casting. When in using a polyimide to form the polymer film by co-casting, it is advisable to use a solvent-soluble polyimide prepared from an aromatic dianhydride and a poly(aromatic diamine) (see JP-T 8-511812).

The above-described method including spreading a polymer in liquid form on the cellulose derivative film and subjecting the resulting laminate to an extension treatment or a contraction treatment accomplishes (a) Rth control during the step of forming the spread layer on the cellulose derivative film and (b) molecular orientation for Re control during the subsequent step of extension or contraction. Compared with conventional methods in which both Rth and Re are controlled simultaneously, such as a biaxial stretching system, such a role-sharing system offers both design and production advantages. That is, the Re and Rth control can be achieved at a smaller stretch ratio, and a biaxially stretched optical compensation film excellent in Rth and Re characteristics and optical axes precision can be obtained more easily.

The molecular orientation treatment can be carried out as a film extension treatment, such as stretching, and/or a film contraction treatment. The stretching may be successive or simultaneous biaxial stretching or uniaxial stretching with the film edges free or fixed. To prevent bowing, uniaxial stretching is preferred.

The stretching temperature is decided in a usual manner. For example, the stretching temperature for a film of the above-described solid polymer is usually around the glass transition temperature (Tg) of the polymer, more usually at or above the Tg. To further reduce the retardation of the stretched cellulose derivative film of the invention, the stretching temperature is preferably near the Tg of the cellulose derivative film, more preferably at temperatures not lower than (Tg-20)° C., even more preferably not lower than (Tg-10)° C., and most preferably not lower than Tg.

The stretch ratio, expressed in terms of a ratio of the length after stretching to the length before stretching, is preferably 1.03 to 2.50, more preferably 1.04 to 2.20, even more preferably 1.05 to 1.80. A stretch ratio of 1.03 or higher is sufficient for forming the aforementioned optically anisotropic layer. A stretch ratio of 2.50 or lower does not cause film curling after a durability test or change in optical characteristics.

The contraction treatment is achieved by, for example, forming a polymer film on a substrate and causing the film to shrink by making use of dimensional change of the substrate with temperature change. A heat shrinkable film may be used as the substrate, in which case it is desirable to control the percent shrinkage by the use of an stretcher, etc.

The thus obtained birefringent film is suited for use as an optical compensation film for improving viewing angle characteristics of LCDs. The birefringent film is also preferably used as a protective film directly bonded to a polarizer to make a polarizing plate thereby to realize the production of thinner LCDs and to reduce the processing steps for the manufacture of LCDs. Here, it is sought to supply a polarizing plate using an optical compensation film at lower cost and higher productivity, and it is desired to improve the productivity and to cut the production cost of the polarizing plate. The optical compensation film of the invention is bonded to a polarizer such that the direction of Re development of the optically anisotropic layer is perpendicular to the absorption axis of the resultant polarizing plate. A general polarizer composed of iodine and PVA is prepared by longitudinal uniaxial stretching so that its absorption axis is in the longitudinal direction. In order to supply a polarizing plate using the optical compensation film having the above-mentioned birefringent film with good productivity and at low cost, it is required that all the aforesaid production steps be conducted in a roll-to-roll system. For all these considerations, especially from the viewpoint of productivity, the optical compensation film having the birefringent film is preferably produced by forming a polymer spread film on the cellulose derivative film and subjecting the resulting laminate film to an extension or contraction treatment so as to orient the polymer molecules in the width direction of the film to develop Re in the width direction. By using the thus prepared optical compensation film in roll form as a polarizer protective film, a polarizing plate with an effective optical compensatory function can be obtained in a roll-to-roll system in a continuous manner.

The term "film in roll form" as used herein means a film having a length of at least 1 m and wound around a core at least three turns in the longitudinal direction. The term "roll-to-roll" as used herein means a processing system in which a film is in the form of a roll both before and after a processing, such as film formation, lamination/bonding with other film fed from a roll, surface treatment, heating/cooling, and extension/contraction. The roll-to-roll processing system is preferred from the standpoint of productivity, cost, and handling.

When the cellulose derivative film is used an optical compensation film, the polarizer and the optical compensation film containing the cellulose derivative film may be bonded with any angle between the transmission axis of the polarizer and the slow axis of the optical compensation film. An LCD has a liquid crystal cell (a liquid crystal layer sandwiched in between electrode substrates), a polarizing plate on each side of the liquid crystal cell, and at least one optical compensation layer between the liquid crystal cell and the polarizing plate.

The liquid crystal layer of the liquid crystal cell is usually formed by sealing a liquid crystal material into a gap defined by a pair of substrates and spacers. A transparent electrode layer is formed on the substrate as a transparent layer containing an electroconductive substance. The liquid crystal cell can further have a gas barrier layer, a hard coat layer or an undercoating layer (or a primer layer) that is provided for enhancement of adhesion to the transparent electrode layer. These layers are usually formed on the substrate. The substrate of the liquid crystal cell usually has a thickness of 50 μm to 2 mm.

The cellulose derivative film of the present invention is applicable to a wide range of display modes of LCDs. Proposed LCD display modes include TN (twisted nematic), IPS (in-plane switching), FLC (ferroelectric liquid crystal), AFLC (anti-ferroelectric liquid crystal) OCB (optically compensatory bend), STN (supper twisted nematic), VA (vertically aligned), ECB (electrically controlled birefringence), and HAN (hybrid aligned nematic). Domain-divided, multi-domain modes of the above modes are also proposed. The cellulose derivative film of the invention is effective in any of these display modes as hereinafter described in some detail. It is also effective in any of transmissive, reflective, and semi-transmissive LCDs.

The cellulose derivative film can be used as a substrate of the optical compensation film or a protective film of the polarizer of a TN mode LCD having a TN mode liquid crystal cell. A TN mode liquid crystal cell and a TN mode LCD have long been known. With respect to the optical compensation film used in TN LCDs, refer to JP-A Nos. 3-9325, 6-148429, 8-50206 and 9-26572 and Mori, et al., *Jpn. J. App. Phys.*, vol. 36, p. 143 (1997) and ibid, vol. 36, p. 1068 (1997).

The cellulose derivative film can be used as a substrate of the optical compensation film or a protective film of the polarizer in an STN mode LCD having an STN mode liquid crystal cell. In common STN LCDs, the liquid crystal cell contains rod-like liquid crystal molecules twisted in the range of 90° to 360°, and the product of its refractive index anisotropy Δn and thickness (cell gap) d, i.e., Δnd is in the range of from 300 to 1500 nm. For the details of the optical compensation film for use in STN LCDs, reference can be made to JP-A 2000-105316.

The cellulose derivative film is particularly advantageously used as a substrate of the optical compensation film of a VA mode LCD having a VA mode liquid crystal cell. It is also useful as a protective film of the polarizer in a VA mode LCD as well. The optical compensation film to be used in a VA mode LCD preferably has Re(589) of 0 to 150 nm and Rth (589) of 70 to 400 nm. The Re(589) is more preferably 20 to 70 nm. In the case where two optically anisotropic polymer films are used in a VA mode LCD, the Rth(589) of the film is preferably 70 to 250 nm. Where one optically anisotropic polymer film is used in a VA mode LCD, the Rth(589) of the film is preferably 150 to 400 nm. The VA mode LCD may have such a multi-domain structure as proposed, e.g., in JP-A 10-123576.

The cellulose derivative film is particularly advantageously used as a substrate of the optical compensation film or a protective film of the polarizer in an IPS mode LCD having an IPS mode liquid crystal cell and an ECB mode LCD having an ECB mode liquid crystal cell. In these modes of LCDs, the liquid crystal molecules are aligned substantially parallel with the substrates in a black display state. That is, the liquid crystal molecules are in parallel with the substrates with no voltage applied to achieve a black display. The polarizer having the cellulose derivative film contributes to viewing angle enhancement and contrast improvement in IPS and ECB mode. In these modes, it is preferred that the optically anisotropic layer positioned between the protective film of the polarizer and the liquid crystal cell has a retardation not more than twice the Δn·d value of the liquid crystal layer; that the absolute value of Rth(589), i.e., |Rth(589)| is 25 nm or less, more preferably 20 nm or less, even more preferably 15 nm or less. For that reason, the cellulose derivative film of the invention is advantageous.

The cellulose derivative film is also advantageously used as a substrate of the optical compensation film or a protective film of the polarizer in an OCB mode LCD having an OCB mode liquid crystal cell and an HAN mode LCD having an HAN mode liquid crystal cell. The optical compensation film used in the OCB and the ECB mode LCDs is preferably such that the direction in which the absolute retardation value is the least exists in neither an in-plane direction nor the nominal direction thereof. The optical properties of the optical compensation film used in these LCDs are governed by the optical properties of the optically anisotropic layer, the optical properties of the substrate, and the configurational relationship between the optically anisotropic layer and the substrate. For more information on the optical compensation film for use in OCB and HAN mode LCDs, reference can be made to JP-A 9-197397 and Mori, et al., *Jpn. J. Appl. Phys.*, vol. 38, p. 2837 (1999).

The cellulose derivative film of the invention is also advantageously used as the optical compensation film or a protective film of the polarizing plate in reflective LCDs of TN mode, STN mode, HAN mode, and GH (guest-host) mode. These display modes have long been known. TN mode reflective LCDs are described in JP-A 10-123478, WO 98/48320, and Japanese Patent 3022477. The optical compensation film for use in reflective LCDs is described in WO 00/65384.

Additionally, the cellulose derivative film of the invention is also used advantageously as a substrate of the optical compensation film or a protective film of the polarizing plate in ASM (axially symmetric aligned microcell) mode LCDs having an ASM mode liquid crystal cell. An ASM mode liquid crystal cell is characterized in that the cell thickness is maintained by a resin spacer the position of which is adjustable. In other respects, the ASM mode liquid crystal cell has the same properties as a TN mode liquid crystal cell. For more information about the ASM mode liquid crystal cell and the ASM mode LCD, Kume, et al., *SID 98 Digest*, p. 1089 (1998) can be referred to.

The optical compensation film, the polarizing plate, and the like according to the invention are applicable to spontaneously emissive display devices to improve display qualities. The spontaneously emissive display devices to which the present invention is applicable include, but are not limited to, organic ELs, PDPs, and FEDs. For example, a birefringent film having an Re of ¼λ can be applied to a spontaneous emission flat panel display to convert linearly polarized light to circularly polarized light thereby forming an anti-reflective filter.

The above-described components of display devices such as LCDs may be an integral laminate or a mere stack. In assembling a display, appropriate optical elements, such as a prism array sheet, a lens array sheet, a diffuser, and a protector, can be disposed as appropriate. These optical elements may be each laminated with the optical compensation film to provide the optical elements described in the form of an integral laminate.

The cellulose derivative film is also preferably applicable to a hard coat film, an antiglare film or an anti-reflective film. Any one or more of a hard coat layer, an antiglare layer, and an anti-reflective layer can be formed on one or both sides of the cellulose derivative film. The resulting optical element can be applied to flat panel displays, e.g., LCDs, PDPs, CRTs, and ELs, to bring about improved visibility. Preferred embodiments of such applications as an antiglare film, an anti-reflective film, etc. are described in detail in *Journal of Technical Disclosure*, No. 2001-1745, pp. 54-57. The cellulose derivative film of the invention is suited for use in these embodiments.

In addition, the cellulose derivative film of the invention is applicable as a support of silver halide photographic materials. JP-A 2000-105445 furnishes the details of color negative films, to which the cellulose derivative film is preferably applied. Application as a support of color reversal silver halide photographic materials is also preferred. The details of materials, formulations, and processing methods relative to these photographic materials are given in JP-A 11-282119.

Having practically no optical anisotropy and high transparency, the cellulose derivative film of the invention also finds use as a substitute for glass substrates of a liquid crystal cell of an LCD, i.e., transparent substrates for sealing liquid crystal material in.

Seeing that the transparent substrates forming a liquid crystal cell should have high gas barrier properties, a gas barrier layer may be provided on at least one side of the cellulose derivative film, if desired. While the gas barrier layer is not limited by form or material, suitable gas barrier layers include a vacuum deposition layer of silicon dioxide and a coating layer of a polymer having relatively high gas barrier properties, such as a vinylidene chloride polymer or a vinyl alcohol polymer.

When the cellulose derivative film is used as a transparent substrate making a liquid crystal cell, it can be provided with a transparent electrode for driving liquid crystal molecules by voltage application. While not limiting, a transparent electrode can be formed on at least one side of the film by laminating with a metal film, a metal oxide film, etc. A metal oxide film is preferred for its transparency, electroconductivity, and mechanical characteristics. A tin/indium oxide film containing tin oxide as a main component and 2% to 15% of zinc oxide is particularly preferred. For the details, refer to JP-A 2001-125079 and JP-A 2000-227603.

The present invention will now be illustrated in greater detail with reference to Examples, but it should be understood that the invention is not deemed to be limited thereto. Unless otherwise noted, all the parts and percents are by weight.

EXAMPLE 1

(1) Preparation of Cellulose Derivative Solution

The components shown in Table 1 below were put into a pressure mixing tank and stirred for 6 hours to prepare cellulose derivative solutions designated T-1 through T-15. In the parentheses under "Substitution Degree" are give the name of the substituent (acyl group), and the figures in the parentheses following the name of the acyl group are polarizability anisotropy $\Delta\alpha$ (unit: $\times 10^{-24}$ cm).

TABLE 1

Composition of Cellulose Derivative Solution (unit: part)

| Solution Designation | Methylene Chloride | Methanol | Cellulose Derivative Substitution Degree (Group($\Delta\alpha$)) | Amount | Additive |
|---|---|---|---|---|---|
| T-1 | 261 | 39 | 2.85 (acetyl(1.01)) | 100 | TPP/BDP 7.8/3.9 |
| T-2 | 261 | 39 | 2.96 (acetyl(1.01)) | 100 | CH-1 19.0 |
| T-3 | 261 | 39 | 2.96 (acetyl(1.01)) | 100 | TPTE 18.0 |
| T-4 | 261 | 39 | 2.4/0.6 (acetyl(1.01))/benzoyl(6.82)) | 100 | — |
| T-5 | 261 | 39 | 2.4/0.6 (acetyl(1.01))/benzoyl(6.82)) | 100 | TPP/BDP 7.8/3.9 |
| T-6 | 261 | 39 | 2.4/0.6 (acetyl(1.01))/benzoyl(6.82)) | 100 | — |
| T-7 | 261 | 39 | 2.4/0.6 (acetyl(1.01))/benzoyl(6.82)) | 100 | TPP/BDP 7.8/3.9 |
| T-8 | 261 | 39 | 2.4/0.6 (acetyl(1.01))/benzoyl(6.82)) | 100 | TPP/BDP 3.9/2.0 |
| T-9 | 261 | 39 | 2.4/0.4 (acetyl(1.01))/asaronic acid acyl(8.61)) | 100 | — |
| T-10 | 261 | 39 | 2.4/0.4 (acetyl(1.01))/asaronic acid acyl(8.61)) | 100 | TPP/BDP 7.8/3.9 |
| T-11 | 261 | 39 | 2.4/0.4 (acetyl(1.01))/benzoic acid(8.61)) | 100 | — |
| T-12 | 261 | 39 | acetyl/benzoyl (2.80/0.19) | 100 | TPP/BDP 7.8/3.9 |
| T-13 | 261 | 39 | acetyl/benzoyl (2.84/0.15) | 100 | TPP/BDP 7.8/3.9 |
| T-14 | 261 | 39 | acetyl/benzoyl (2.6/0.4) | 100 | PMMA 5 |
| T-15 | 261 | 39 | acetyl/benzoyl (2.4/0.6) | 100 | CH-2 11.7 |

TPP: triphenyl phosphate
BDP: biphenyldiphenyl phosphate
TPTE: trimethylolpropane triethyl ester
PMMA: polymethylmethacrylate
CH-1: compound of formula:

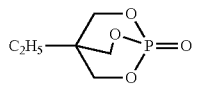

CH-2: compound of formula:

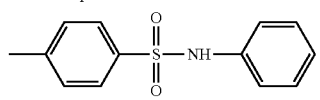

(2) Preparation of Additive Solution

The components shown in Table 2 below were put into a pressure mixing tank and stirred at 39° C. to prepare an additive solution designated U-1 through U-6.

TABLE 2

Composition of additive solution (unit: part)

| Solution Designation | Methylene Chloride | Methanol | UV Absorber Kind | Amount |
|---|---|---|---|---|
| U-1 | 80 | 20 | UVB-3/UVB-7 | 4.3/8.7 |
| U-2 | 80 | 20 | UVB-102 | 65 |
| U-3 | 80 | 20 | — | — |
| U-4 | 80 | 20 | UVB-3/UVB-7 | 38/38 |
| U-5 | 80 | 20 | UV-23 | 65 |
| U-6 | 80 | 20 | UVB-103/UVB-104 | 3.5/3.5 |

UVB-3: 2-(2'-hydroxy-3',5'-di-t-butylphenyl)-5-chlorobenzotriazole
UVB-7: 2-(2'-hydroxy-3',5'-di-t-pentylphenyl)-benzotriazole
UVB-102: compound of formula:

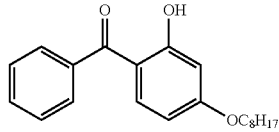

UVB-103: compound of formula:

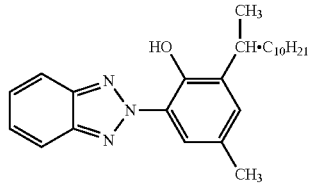

UVB-104: compound of formula:

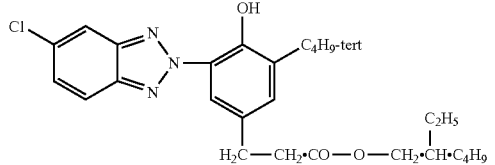

(3) Preparation of Cellulose Derivative Film Sample 001

In a pressure mixing tank were put 477 parts of cellulose derivative solution T-1 and 44 parts of additive solution U-1 and stirred thoroughly to prepare a dope. The dope was cast on a metal support by means of a belt casting machine and dried to become a self-supporting web. The web was peeled off the metal support, further dried as gripped by both edges by a tenter frame so as to maintain its width, and wound up to obtain a roll of cellulose derivative film sample 001 with a thickness of 80 μm and a width of 1.3 m.

(4) Preparation of Cellulose Derivative Film Samples 002 to 024

Cellulose derivative film samples 002 to 024 with a thickness of 80 μm were prepared in the same manner as for sample 001, except for using the cellulose derivative solutions and additive solutions shown in Table 3 and changing the film width as shown in Table 3.

(5) Preparation of Cellulose Derivative Film Sample 025

A cellulose derivative film sample 0025 was prepared in the same manner as for the cellulose derivative film sample 001, except for using the cellulose derivative solutions used for dope preparation, additive solutions shown in Table 3 and a thickness of 40 μm, and changing the film width as shown in Table 3.

(6) Preparation of Cellulose Derivative Film Samples 026 to 028

In a pressure mixing tank were put 477 parts by mass of cellulose derivative solution T-15 and 44 parts by mass of additive solution shown in Table 3 and stirred thoroughly to prepare a dope. Using an exclusive die having a width of 800 mm, the dope was cast on a metal support by means of a belt casting machine and dried to become a self-supporting web. The web was peeled off the metal support, further dried as gripped by both edges by a tenter frame so as to maintain its width, and wound up to obtain cellulose derivative film samples 026, 027 and 028 with a thickness of 80 μm, 60 μm and 40 μm respectively. The thickness of the film was regulated with a casting rate of a dope. The casting rate of a dope was regulated so that a film having a given thickness may include an equal amount of a remaining solvent after peeling off the metal support. After withdrawing the film from the tenter frame, followed by drying, the both edges of the film were cut off prior to winding to the width shown in Table 3.

(7) Surface Treatment

Cellulose derive film sample 001 was surface treated as follows.

The film was immersed in a 1.5N sodium hydroxide aqueous solution at 55° C. for 2 minutes, rinsed in a room temperature washing water bath, neutralized with 0.1N sulfuric acid at 30° C., again rinsed in a room temperature washing water bath, and dried with hot air at 100° C. Cellulose derivative film samples having their both sides alkali-saponified were thus obtained.

Film samples 002 to 028 were surface treated in the same manner to prepare cellulose derivative film samples having their both sides alkali-saponified.

(8) Evaluation of Cellulose Derivative Film

The resulting film samples were evaluated for optical performance in terms of Re(589), Rth(589), |Rth(700)−Rth(450)|(=ΔRth), and |Re(700)−Re(450)|(=ΔRe) in accordance with the methods described supra. Furthermore, the ratio of the degree of alignment in the MD to that in the TD was obtained in accordance with the method described supra.

The equilibrium water content of the film samples at 25° C. and 80% RH was measured in accordance with the method described supra.

(9) Preparation of Polarizing Plate

A polarizing plate was prepared using each of the surface-treated film samples 001 to 025.

An unrolled, 80 μm thick PVA film was stretched 5 times in an iodine aqueous solution and dried to obtain a polarizer. The polarizer was laminated on both sides with the cellulose derivative film (surface treated on both sides thereof) via a PVA adhesive to make a polarizing plate having the polarizer protected on both sides with the cellulose derivative film. The manner of laminating was such that the slow axis of each cellulose derivative protective film was parallel to the transmission axis of the polarizer.

(10) Preparation of Polarizing Plate II

A rolled, 80 μm thick polyvinyl alcohol film was stretched 5 times in an iodine aqueous. Separately, a commercially available cellulose acetate film (TD80UF, available from Fuji Photo Film Co., Ltd.) slit-treated in the width of 650 mm, successively surface treated in the same manner as in the cellulose derivative film samples of the present invention and the foregoing surface treated film sample 026 were laminated on both sides of the polarizing film with a polyvinyl alcohol-based adhesive. The manner of laminating was such that the slow axis of cellulose the derivative film sample 001 was parallel to the transmission axis of the polarizing film.

(11) Preparation of Polarizing Plate III

A polarizing plate was prepared in the same manner as in the preparation of the polarizing plate II except that a commercially available cellulose acetate film (TD80UF, available from Fuji Photo Film Co., Ltd.) was used on one side of a polarizing film and the cellulose acetate derivative film sample 027 of the present invention was used on another side of the polarizing film.

(12) Preparation of Polarizing Plate IV

A polarizing plate was prepared in the same manner as in the preparation of the polarizing plate II except that a commercially available cellulose acetate film (T40UZ, available from Fuji Photo Film Co., Ltd.) having an anti-reflective layer thereon was used on one side of a polarizing film and the cellulose acetate derivative film sample 028 of the present invention was used on another side of the polarizing film.

(13) Evaluation of Polarizing Plate Sample

The durability of a polarizing plate sample prepared was evaluated according to the following method.

Each of the resulting polarizing plate samples was allowed to stand at 60° C. and 95% RH for 650 hours. A polarization degree was measured before and after the standing. The difference was taken as a measure of durability of the polarizing plate.

The results obtained in the state wherein a polarizing plate is adhered on glass via an adhesive are shown in Tables 3 and 4.

TABLE 3

Dope Formulation

| | Cellulose Derivative Solution | | | | | | | | | Additive Solution | | |
|---|---|---|---|---|---|---|---|---|---|---|---|---|
| | Cellulose Derivative | | | | | | | | | | | |
| | | | | Group with High Polarizability Anisotropy | | | | | | | | |
| Film Sample No. | Solution No. | OH Group | Acetyl group (logP = −0.194) | Structure No. | logP | Substi- tution Degree | Additive Kind | Amount* | Solution No. | UV Absorber Kind | Amount* |
| 001 | T-1 | 0.15 | 2.85 | — | — | — | TPP/BDP | 11.7 | U-1 | UVB-3/UVB-7 | 0.4/0.8 |
| 002 | T-2 | 0.04 | 2.9 | — | — | — | CH-1 | 19 | U-2 | UVB-102 | 6 |
| 003 | T-3 | 0.04 | 2.9 | — | — | — | TPTE | 18 | U-2 | UVB-102 | 6 |
| 004 | T-4 | 0 | 2.4 | 1 | 1.885 | 0.6 | — | — | U-3 | — | — |
| 005 | T-4 | 0 | 2.4 | 1 | 1.885 | 0.4 | — | — | U-2 | UVB-102 | 6 |
| 006 | T-4 | 0 | 2.4 | 1 | 1.885 | 0.6 | — | — | U-4 | UVB-3/UVB-7 | 3.5/3.5 |
| 007 | T-4 | 0 | 2.4 | 1 | 1.885 | 0.6 | — | — | U-5 | UV-23 | 6 |
| 008 | T-5 | 0 | 2.4 | 1 | 1.885 | 0.6 | TPP/BDP | 11.7 | U-4 | UVB-4/UVB-7 | 3.5/3.5 |
| 009 | T-5 | 0 | 2.4 | 1 | 1.885 | 0.6 | TPP/BDP | 11.7 | U-5 | UV-23 | 6 |
| 010 | T-6 | 0 | 2.6 | 1 | 1.885 | 0.4 | — | — | U-3 | — | — |
| 011 | T-6 | 0 | 2.4 | 1 | 1.885 | 0.4 | — | — | U-2 | UVB-102 | 6 |
| 012 | T-6 | 0 | 2.6 | 1 | 1.885 | 0.4 | — | — | U-4 | UVB-3/UVB-7 | 3.5/3.5 |
| 013 | T-6 | 0 | 2.6 | 1 | 1.885 | 0.4 | — | — | U-5 | UV-23 | 6 |
| 014 | T-7 | 0 | 2.6 | 1 | 1.885 | 0.4 | TPP/BDP | 11.7 | U-4 | UVB-3/UVB-7 | 3.5/3.5 |
| 015 | T-7 | 0 | 2.6 | 1 | 1.885 | 0.4 | TPP/BDP | 11.7 | U-5 | UV-23 | 6 |
| 016 | T-8 | 0 | 2.6 | 1 | 1.885 | 0.4 | TPP/BDP | 6 | U-4 | UVB-3/UVB-7 | 3.5/3.5 |
| 017 | T-8 | 0 | 2.6 | 1 | 1.885 | 0.4 | TPP/BDP | 6 | U-5 | UV-23 | 6 |
| 018 | T-9 | 0 | 2.6 | 13 | 1.257 | 0.4 | — | — | U-3 | — | — |
| 019 | T-9 | 0.2 | 2.4 | 13 | 1.257 | 0.4 | — | — | U-5 | UV-23 | 6 |
| 020 | T-10 | 0.2 | 2.4 | 13 | 1.257 | 0.4 | TPP/BDP | 11.7 | U-5 | UV-23 | 6 |
| 021 | T-11 | 0.1 | 2.7 | 1 | 1.885 | 0.2 | — | — | U-3 | — | — |
| 022 | T-12 | 0.1 | 2.8 | 1 | 1.885 | 0.19 | TPP/BDP | 11.7 | U-2 | UVB-102 | 7 |
| 023 | T-13 | 0.1 | 2.84 | 1 | 1.885 | 0.15 | TPP/BDP | 11.7 | U-2 | UVB-102 | 6 |
| 024 | T-14 | 0 | 2.4 | 1 | 1.885 | 0.6 | PMMA | 5 | U-6 | UVB-103/UVB-104 | 4/2 |
| 025 | T-14 | 0 | 2.4 | 1 | 1.885 | 0.6 | PMMA | 5 | U-6 | UVB-103/UVB-104 | 4/2 |
| 026 | T-15 | 0 | 2.4 | 1 | 1.885 | 0.6 | CH-2 | 11.7 | U-2 | UVB-102 | 6 |
| 027 | T-15 | 0 | 2.4 | 1 | 1.885 | 0.6 | CH-2 | 11.7 | U-2 | UVB-102 | 6 |
| 028 | T-15 | 0 | 2.4 | 1 | 1.885 | 0.6 | CH-2 | 11.7 | U-4 | UVB-3/UVB-7 | 3.5/3.5 |

*Expressed in a relative amount, taking the cellulose acylate as 100.

TABLE 4

| | | | | | | | | VA Mode LCD | | |
|---|---|---|---|---|---|---|---|---|---|---|
| Film Sample No. | Alignment Degree | | Retardation (nm) | | | | Equilibrium Water Content (%) | Polarizing Plate Durability (=ΔP); 60° C., 95% RH × 650 hrs | Light Leakage in Black State (%) | Black Luminance Increase (%) after Durability Test | Remark |
| | Width (m) | MD/TD Ratio | Re | ΔRe (700-450) | Rth | ΔRth (700-450) | | | | | |
| 001 | 1.3 | 1.01 | 1 | −2 | 46 | 18 | 2.9 | 0.19 | 0.54 | 0.5 | comparison |
| 002 | 1.3 | 1.01 | 1 | −2 | −8 | 12 | 3.3 | 0.26 | 0.12 | 0.6 | comparison |
| 003 | 1.3 | 1.02 | 1 | −2 | −9 | 12 | 3.2 | 0.24 | 0.11 | 0.6 | comparison |
| 004 | 1.3 | 1.02 | −2 | −4 | −65 | 32 | 2 | 0.06 | 0.79 | 0.2 | comparison |
| 005 | 1.3 | 1.02 | 1 | −2 | −19 | 13 | 1.6 | 0.05 | 0.25 | 0.1 | invention |
| 006 | 1.3 | 1.02 | 2 | 3 | −4 | 3 | 1.6 | 0.05 | 0.05 | 0.1 | invention |
| 007 | 1.6 | 1.01 | 1 | 3 | −3 | 4 | 1.6 | 0.05 | 0.06 | 0.1 | invention |
| 008 | 1.3 | 1.01 | 1 | 2 | −11 | 3 | 1.4 | 0.05 | 0.12 | 0.1 | invention |
| 009 | 1.6 | 1.01 | 1 | 2 | −8 | 4 | 1.4 | 0.05 | 0.09 | 0.1 | invention |
| 010 | 1.3 | 1.01 | −2 | −3 | −40 | 31 | 2.1 | 0.06 | 0.49 | 0.2 | comparison |
| 011 | 1.3 | 1.02 | 1 | −2 | −4 | 13 | 1.6 | 0.05 | 0.05 | 0.1 | invention |
| 012 | 1.3 | 1.02 | 2 | 2 | 9 | 2 | 1.7 | 0.04 | 0.07 | 0.1 | invention |
| 013 | 1.6 | 1.02 | 2 | 2 | 8 | 3 | 1.7 | 0.05 | 0.06 | 0.1 | invention |
| 014 | 1.3 | 1.01 | 1 | 1 | 2 | 1 | 1.5 | 0.04 | 0.04 | 0.1 | invention |
| 015 | 1.9 | 1.01 | 1 | 1 | 1 | 3 | 1.5 | 0.05 | 0.04 | 0.1 | invention |
| 016 | 1.3 | 1.02 | 2 | 1 | 5 | 2 | 1.6 | 0.04 | 0.06 | 0.1 | invention |
| 017 | 1.9 | 1.02 | 2 | 1 | 4 | 3 | 1.6 | 0.05 | 0.05 | 0.1 | invention |
| 018 | 1.5 | 1.02 | −2 | −3 | −50 | 24 | 2.2 | 0.06 | 0.61 | 0.2 | comparison |
| 019 | 1.5 | 1.02 | 2 | 1 | −3 | 4 | 1.8 | 0.05 | 0.05 | 0.1 | invention |
| 020 | 1.5 | 1.02 | 2 | 2 | 1 | 5 | 1.6 | 0.05 | 0.06 | 0.1 | invention |
| 021 | 1.3 | 1.02 | −3 | −2 | −5 | 32 | 2.6 | 0.06 | 0.12 | 0.4 | invention |

TABLE 4-continued

| | | | | | | | | | VA Mode LCD | | |
|---|---|---|---|---|---|---|---|---|---|---|---|
| Film | Alignment Degree | | Retardation (nm) | | | | Equilibrium Water | Polarizing Plate Durability | Light Leakage in | Black Luminance | |
| Sample No. | Width (m) | MD/TD Ratio | Re | ΔRe (700-450) | Rth | ΔRth (700-450) | Content (%) | (=ΔP); 60° C., 95% RH × 650 hrs | Black State (%) | Increase (%) after Durability Test | Remark |
| 022 | 1.3 | 1.02 | 3 | 2 | −24 | 4 | 1.4 | 0.06 | 0.05 | 0.1 | |
| 023 | 1.3 | 1.02 | 1 | 2 | 0 | 3 | 1.4 | 0.07 | 0.05 | 0.1 | |
| 024 | 1.3 | 1.02 | 2 | 2 | −5 | 3 | 1.4 | 0.05 | 0.05 | 0.1 | |
| 025 | 1.3 | 1.02 | 1 | 1 | −5 | 2 | 1.4 | 0.08 | 0.06 | 0.2 | |
| 026 | 0.65 | 1.01 | 3 | 2 | −9 | 3 | 1.5 | 0.05 | 0.05 | 0.1 | |
| 027 | 0.65 | 1.01 | 3 | 2 | −7 | 4 | 1.5 | 0.08 | 0.06 | 0.1 | |
| 028 | 0.65 | 1.01 | 1 | 1 | −4 | 3 | 1.4 | 0.09 | 0.06 | 0.2 | |

The results in Table 4 prove that the cellulose derivative film of the present invention has a low equilibrium water content as well as high optical isotropy. When used as a protective film of a polarizing plate, the cellulose derivative film reduces a reduction in polarization of the polarizing plate due to exposure to hot and humid conditions thereby improving the durability of the polarizing plate.

EXAMPLE 2

(1) Preparation of Optical Compensation Film

A 17% cyclohexanone solution of a polyimide (weigh average molecular weight: 60,000; synthesized from 2,2'-bis(3,4-dicarboxyphenyl)hexafluoropropane and 2,2'-bis(trifluoromethyl)-4,4'-diaminobiphenyl) was applied to a commercially available polyethylene terephthalate (PET) film and dried at 95° C. for 12 minutes. The polyimide film as formed on the PET film was transversely stretched at a stretch ratio of 18% at a temperature 5° C. lower than the Tg of the polyimide film to obtain an optically anisotropic layer having Re(589) of 55 nm and |Rth(589)| of 238 nm. The optically anisotropic layer was adhered to cellulose derivative film sample 001 prepared in Example 1 via a 15 μm thick acrylic adhesive, and the PET film was stripped off to provide an optical compensation film having the optically anisotropic layer (designated optical compensation film sample 001).

(2) Preparation of Optical Compensation Film Samples 002 to 025

Optical compensation film samples 002 to 025 were prepared in the same manner as optical compensation film sample 001, except for using the cellulose derivative film samples 001 to 021 prepared in Example 1.

(3) Alkali Saponification Treatment

The optical compensation film samples 001 to 025 were each subjected to alkali saponification treatment in the same manner as in Example 1.

(4) Preparation of Polarizing Plate

A polarizing plate was prepared using each of the surface-treated optical compensation film samples 001 to 025 as follows. A polarizer was laminated on one side thereof with the surface-treated optical compensation film with the optically anisotropic layer side out. The polarizer was also laminated on the other side with the surface-treated (both sides treated) cellulose derivative film obtained in Example 1 (sample Nos. 001 to 025). The laminating was effected using a PVA-based adhesive in the same manner as in Example 1. The resulting polarizing plates with an optical compensation film are designated polarizing plate samples 001 through 025.

Separately, a commercially available cellulose acetate film (Fuji Tack TD80UF, available from Fuji Photo Film Co., Ltd.; Re=3 nm; Rth=50 nm) was surface treated by alkali saponification in the same manner as in Example 1 and laminated on both sides of a polarizer in the same manner as in Example 1 to prepare polarizing plate 301.

(5) Fabrication of VA Mode LCD

To a 3% PVA aqueous solution was added 1% octadecyldimethylammonium chloride (coupling agent), and the resulting solution was applied to two glass substrates having an ITO electrode layer by spin coating and heat treated at 160° C. The PVA film was subjected to a rubbing treatment to form a vertical alignment layer. The two glass substrates with the alignment layer were assembled into a cell at a cell gap (d) of about 4.3 μm with their rubbing directions opposite. A liquid crystal composition (Δn=0.06) mainly comprising an ester compound and an ethane compound was sealed into the cell to make a VA mode liquid crystal cell. The product of Δn and d was 260 nm.

The polarizing plate sample 001 was bonded on its optically anisotropic layer side to the liquid crystal cell via a pressure-sensitive adhesive. To the opposite side of the liquid crystal cell was bonded polarizing plate 301 via a pressure-sensitive adhesive with its absorption axis perpendicular to that of the opposing polarizing plate sample 001. There was thus fabricated a VA mode LCD.

VA mode LCDs were fabricated in the same manner as above, except for using the polarizing plate samples 002 to 025.

(6) Evaluation of Display Panel (6-1) Viewing Angle Dependence

Viewing angle dependence of transmittance of the resulting LCD panel was measured as follows. The transmittance was measured at an increasing elevation for every 10° up to 80° from the frontal direction to an oblique direction and at an increasing azimuth for every 10° up to 360° with respect to the horizontal/right direction (=0°). It was found that the luminance in a black display state increased due to light leakage as the elevation from the frontal direction increased and reached the maximum at an elevation of around 70°. It was ascertained that the increase in luminance in a black state led to deterioration of contrast. So, a luminance in a black display state was measured at an elevation of 60° and an azimuth of 45° counterclockwise from the rubbing direction of the liquid crystal cell (luminance LA), and a luminance in a white display state was measured at an elevation of 60° and an azimuth of 45° counterclockwise with respect to the rubbing direction of the liquid crystal cell (luminance LB). Light leakage (%) was obtained as a ratio of LA to LB, which was taken as a measure of contrast evaluation. The results obtained are shown in Table 4 above.

$$\text{Light leakage (\%)} = LA/LB \times 100$$

(6-2) Durability

The black luminance at the center of the screen at an eye level was measured before and after a durability test to obtain measure a black luminance difference (increase) caused by the test. The percentage of the black luminance increase to the white luminance before the durability test was obtained as a measure with which to evaluate durability of the LCD panel. The results obtained are shown in Table 4.

Black luminance increase (%)=[(black luminance after durability test)−(black luminance before durability test)]/white luminance before durability test×100

It can be seen from the results in Table 4 that the polarizing plate having the cellulose derivative film of the present invention as a protective film suppresses an increase of black luminance caused by long-term exposure to high temperature and humidity thereby to provide an LCD with superior durability.

EXAMPLE 3

Mounting on IPS Mode LCD Panel

The cellulose derivative film sample prepared in Example 1 was mounted on an LCD panel to examine the LCD optical performance as follows, While an IPS mode liquid crystal cell was used in Example 3, and a VA and an OCB mode liquid crystal cell were used in other Examples, the application of the polarizing plate or optical compensation film using the cellulose derivative film of the invention is not limited by the operation mode of LCDs.

A polarizing plate sample (with no optically anisotropic layer), designated polarizing plate sample 001, was prepared in the same manner as in Example 2 using cellulose derivative film sample 001 of Example 1. An optical compensation film prepared by uniaxially stretching Arton film (available from JSR Corp.) was bonded to polarizing plate sample 001 to afford an optical compensation function to the polarizing plate. By crossing the slow axis of the in-plane retardation of the optical compensation film with the transmission axis of polarizing plate sample 001, the visual characteristics can be improved without causing any change in front characteristics. The optical compensation film used had Re(589) of 270 nm, Rth(589) of 0 nm, and an Nz factor of 0.5.

The resulting laminate of polarizing plate sample 001 and the optical compensation film was stacked on both sides of an IPS mode liquid crystal cell, with the optical compensation film side facing the liquid crystal cell, to assemble an IPS mode LCD. The manner of stacking was such that the transmission axes of the upper and lower polarizing plates were perpendicular to each other, and the transmission axis of the upper polarizing plate was parallel to the molecular length direction of the liquid crystal cell, that is, the slow axis of the optically anisotropic layer was perpendicular to the molecular length direction of the liquid crystal cell. A conventional liquid crystal cell and conventional substrates with electrode were used as such in LCD fabrication. The alignment of the liquid crystal cell was horizontal alignment, and the liquid crystal material showed positive dielectric anisotropy. Any commercially available liquid crystal material developed for IPS application can be utilized. The characteristics of the liquid crystal cell prepared were: Δn of liquid crystal material=0.099; cell gap (d)=3.0 μm; pretilt angle=5°; rubbing direction=75° (on both the upper and lower substrates).

Polarizing plate samples 002 to 025 were prepared in the same manner using the cellulose derivative film samples 002 to 025 prepared in Example 1. A pair of laminates of each of the polarizing plate samples 002 to 021 and the same optical compensation film as used above were prepared in the same manner as described and incorporated into an IPS mode LCD in the same manner as described.

The resulting IPS mode LCDs were evaluated for viewing angle dependence of contrast and durability in the same manner as in Example 2. It was confirmed as a result that all the LCDs using the polarizer protective film of the invention suffer from a reduced increase of black luminance and exhibit high durability similarly to the LCDs of Example 3.

EXAMPLE 4

Evaluation of Mounting on IPS Mode Liquid Crystal Display

One half of a polarizing plate adhered on the backlight side of the panel of a commercially available liquid crystal television (37Z1000, manufactured by Toshiba Co., Ltd.) was stripped off and the polarizing plate II produced according to the present invention was adhered with an adhesive sheet in such a manner that the cellulose derivative film of the present invention may be located on the liquid crystal panel side. The absorption axis of the polarizer was arranged in the same direction with that of the stripped polarizing plate.

Similarly, regarding polarizing plates III and IV, displays were prepared wherein the cellulose derivative of the present invention was incorporated to IPS liquid crystal cell as in polarizing plate II.

The prepared liquid crystal display was determined regarding viewing angle contrast and durability according to the same manner as in Example 2. As the result, it was found that the liquid crystal display using the protective film for the polarizing plate of the invention suffers from a reduced increase of black luminance and exhibits high durability similarly to the LCDs of Example 3.

EXAMPLE 5

Evaluation of Mounting on IPS Mode Liquid Crystal Display

Polarizing plates adhered on both sides of the panel of a commercially available liquid crystal television (26C1000, manufactured by Toshiba Co., Ltd.) were stripped off and the polarizing plate II produced according to the present invention was adhered with an adhesive sheet on both sides of the panel in such a manner that the cellulose derivative film of the present invention may be located on the liquid crystal panel side. The absorption axis of the polarizer was arranged in the same direction with that of the stripped polarizing plate.

The prepared liquid crystal display was determined regarding viewing angle contrast and durability according to the same manner as in Example 2. As the result, it was found that the liquid crystal display using the protective film for the polarizing plate of the invention suffers from a reduced increase of black luminance and exhibits high durability similarly to the LCDs of Example 3.

EXAMPLE 6

Mounting on VA and OCB Mode LCDs

The cellulose derivative films prepared in Example 1 were evaluated in applications to the LCD described in Example 1 of JP-A 10-48420, the optically anisotropic layer containing discotic liquid crystal molecules and the PVA alignment layer described in Example 1 of JP-A-9-26572, the VA mode LCD described in FIGS. 2 to 9 of JP-A 2000-154261, and the OCB mode LCD described in FIGS. 10 to 15 in JP-A 2000-154261. As a result, every application showed satisfactory results in dependence of contrast and color on viewing angle. These display characteristics were little dependent on humidity. Furthermore, the film samples of invention in these applications exhibited satisfactory performance in terms of unevenness of performance after a durability test.

EXAMPLE 7

Optical Compensation Film Performance

An optical compensation film sample was prepared using the cellulose derivative films of Example 1 in accordance with the procedures described in Example 1 of JP-A 7-333433. The resulting filter films exhibited excellent viewing angle characteristics in both the vertical and horizontal directions. The cellulose derivative film of the invention was thus proved superior for optical applications.

This application is based on Japanese Patent application JP 2005-288412, filed Sep. 30, 2005, the entire content of which is hereby incorporated by reference, the same as if set forth at length.

The invention claimed:

1. A cellulose derivative film comprising a cellulose derivative having a substituent,
the substituent having a polarizability anisotropy $\Delta\alpha$ of $2.5\times10^{-24}$ $cm^3$ or more,
the polarizability anisotropy $\Delta\alpha$ being represented by equation:

$$\Delta\alpha=\alpha x-(\alpha y+\alpha z)/2$$

wherein $\Delta\alpha$ is the largest of the eigenvalues obtained by diagonalization of a polarizability tensor; ay is the second largest of the eigenvalues obtained by diagonalization of a polarizability tensor; and az is the smallest of the eigenvalues obtained by diagonalization of a polarizability tensor,
and
the cellulose derivative film having an Re and an Rth satisfying the respective inequalities:

$$|Rth(589)|\leq 25 \text{ nm}$$

$$|Re(589)|\leq 10 \text{ nm}$$

wherein $Rth(\lambda)$ is a retardation in the thickness direction at a wavelength $\lambda$ nm; and $Re(\lambda)$ is an in-plane retardation at a wavelength $\lambda$ nm.

2. The cellulose derivative film according to claim 1, wherein the substituent having a polarizability anisotropy of $2.5\times10^{-24}$ $cm^3$ or more is a substituent containing an aromatic ring.

3. The cellulose derivative film according to claim 1, wherein the substituent having a polarizability anisotropy of $2.5\times10^{-24}$ $cm^3$ or more is an aromatic acyl group.

4. The cellulose derivative film according to claim 1, further comprising a compound having a spectral absorption maximum in a wavelength range of from 250 to 400 nm.

5. The cellulose derivative film according to claim 1, wherein the $Rth(\lambda)$ satisfies inequality:

$$|Rth(700)-Rth(450)|\leq 30 \text{ nm}$$

wherein $Rth(\lambda)$ is as defined above.

6. The cellulose derivative film according to claim 1, having an equilibrium water content of 3.0% or less at 25° C. and 80% RH.

7. The cellulose derivative film according to claim 1, having a ratio of the degree of alignment in the machine direction to the degree of alignment in the transverse direction is 1:0.9 to 1.1.

8. An optical compensation film comprising the cellulose derivative film of claim 1 and an optically anisotropic layer.

9. A polarizing plate comprising a polarizer and a transparent protective film on each side of the polarizer, at least one of the protective films is the cellulose derivative film of claim 1.

10. A liquid crystal display comprising a liquid crystal cell and a polarizing plate on each side of the liquid crystal cell, at least one of the polarizing plates is the polarizing plate of claim 9.

11. The liquid crystal display according to claim 10, the display mode of which is a VA mode.

12. The liquid crystal display according to claim 10, the display mode of which is an IPS mode.

* * * * *